United States Patent
Bae et al.

(10) Patent No.: US 12,058,675 B2
(45) Date of Patent: Aug. 6, 2024

(54) METHOD, USER EQUIPMENT, AND APPARATUS FOR PERFORMING UPLINK TRANSMISSION, COMPUTER-READABLE STORAGE MEDIUM, AND METHOD AND BASE STATION FOR RECEIVING UPLINK TRANSMISSION

(71) Applicant: LG ELECTRONICS INC., Seoul (KR)

(72) Inventors: Duckhyun Bae, Seoul (KR); Sukhyon Yoon, Seoul (KR); Hyunsoo Ko, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 17/630,427

(22) PCT Filed: Aug. 13, 2020

(86) PCT No.: PCT/KR2020/010783
§ 371 (c)(1),
(2) Date: Jan. 26, 2022

(87) PCT Pub. No.: WO2021/034016
PCT Pub. Date: Feb. 25, 2021

(65) Prior Publication Data
US 2022/0287058 A1    Sep. 8, 2022

(30) Foreign Application Priority Data

Aug. 16, 2019  (KR) .................. 10-2019-0100120

(51) Int. Cl.
*H04W 72/1268*    (2023.01)
*H04L 1/1812*    (2023.01)
(Continued)

(52) U.S. Cl.
CPC ....... *H04W 72/1268* (2013.01); *H04L 1/1812* (2013.01); *H04W 72/23* (2023.01); *H04W 74/0833* (2013.01)

(58) Field of Classification Search
CPC ............. H04W 72/1268; H04W 72/23; H04W 74/0833; H04L 1/1812; H04L 1/0026;
(Continued)

(56) References Cited

U.S. PATENT DOCUMENTS

| | | | |
|---|---|---|---|
| 2010/0002630 A1* | 1/2010 | Park ...................... | H04W 72/23 370/328 |
| 2010/0035581 A1* | 2/2010 | Park ...................... | H04W 72/21 714/E11.131 |

(Continued)

OTHER PUBLICATIONS

R1-1907959: 3GPP TSG-RAN WG1 Meeting #97, Reno, Nevada, US May 13-17, (May 25, 2019) "Clarification and aligning of terminologies on MSG3 (re) transmission and RAR UL grant in 38.213," Ericsson, Qualcomm, (4 Pages).

(Continued)

*Primary Examiner* — Mang Hang Yeung
(74) *Attorney, Agent, or Firm* — BRYAN CAVE LEIGHTON PAISNER LLP

(57) ABSTRACT

A UE can perform first uplink transmission on the basis of a first scheduling message without NDI, receive a second scheduling message including an NDI field, and perform i) retransmission for the first uplink transmission or ii) new uplink transmission on the basis of the NDI field in the second scheduling message. Performing the retransmission for the first uplink transmission or the new uplink transmission can comprise: determining, in a state in which an NDI value for the first scheduling message is considered a specific value, whether the value of the NDI field is toggled in comparison to the specific value; performing the retransmission for the first uplink transmission on the basis of the (Continued)

non-toggling of the value of the NDI field in comparison to the specific value; and performing the new uplink transmission on the basis of the toggling of the value of the NDI field in comparison to the specific value.

14 Claims, 11 Drawing Sheets

(51) Int. Cl.
*H04W 72/23* (2023.01)
*H04W 74/0833* (2024.01)

(58) Field of Classification Search
CPC ..... H04L 1/1819; H04L 1/1861; H04L 1/188; H04L 1/1614; H04L 1/1854; H04L 1/1864; H04L 1/1822; H04L 5/0053; H04L 5/0055
USPC ........................................................ 370/329
See application file for complete search history.

(56) References Cited

U.S. PATENT DOCUMENTS

| 2011/0235586 | A1* | 9/2011 | Han ..................... H04L 25/0391 |
| | | | 370/328 |
| 2017/0273056 | A1 | 9/2017 | Papasakellariou et al. |
| 2018/0255536 | A1 | 9/2018 | Suzuki et al. |
| 2022/0095374 | A1* | 3/2022 | Wang ................ H04W 74/0808 |

OTHER PUBLICATIONS

R1-1907964: 3GPP TSG-RAN WG1 Meeting #97, Reno, Nevada, US May 13-17, 2019, "Correction to 38.214 including alignment of terminology across specifications," Nokia, (41 Pages).

R1-1907965: 3GPP TSG-RAN WG1 Meeting #97, Reno, Nevada, US May 13-17, 2019, "Correction to 38.213 Including alignment of terminology across specifications," Samsung (31 pages).

\* cited by examiner

FIG. 5
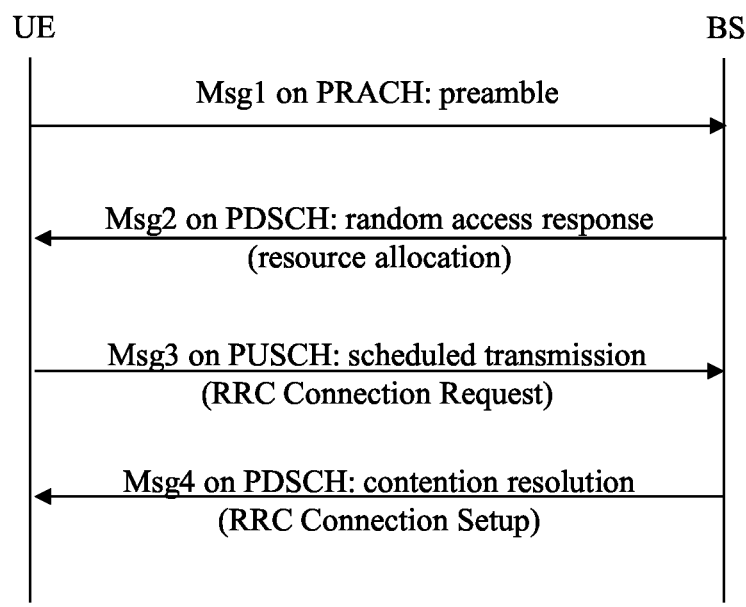
(a)
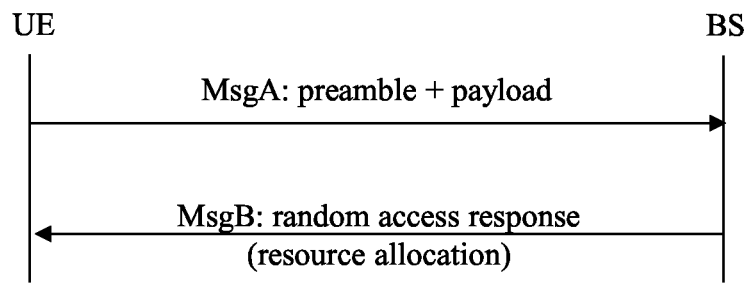
(b)

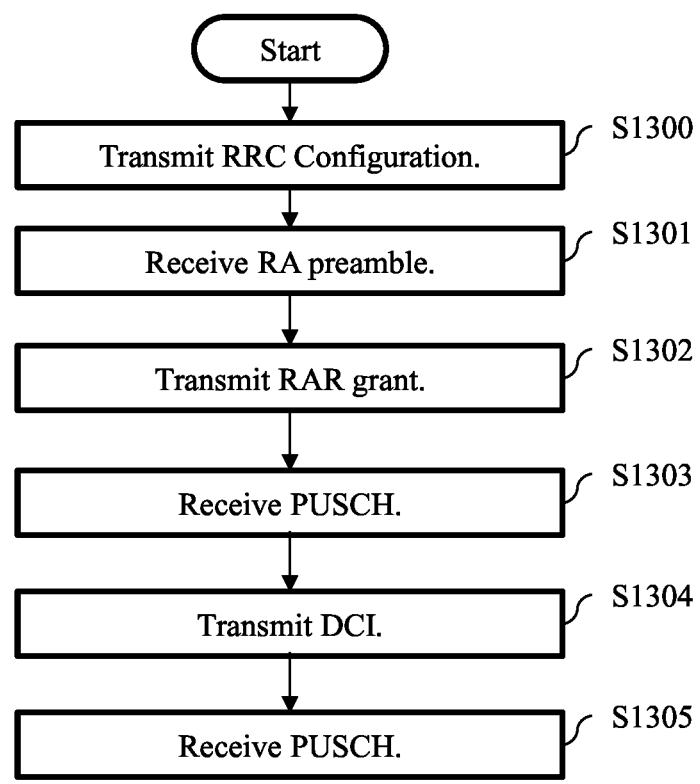

METHOD, USER EQUIPMENT, AND APPARATUS FOR PERFORMING UPLINK TRANSMISSION, COMPUTER-READABLE STORAGE MEDIUM, AND METHOD AND BASE STATION FOR RECEIVING UPLINK TRANSMISSION

This application is the National Stage filing under 35 U.S.C. 371 of International Application No. PCT/KR2020/010783 filed on Aug. 13, 2020, which claims priority to Korean Patent Application No. 10-2019-0100120 filed on Aug. 16, 2019, the contents of which are all hereby incorporated by reference herein in their entirety.

TECHNICAL FIELD

The present disclosure relates to a wireless communication system.

BACKGROUND ART

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

DISCLOSURE

Technical Problem

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

Technical Solution

In an aspect of the present disclosure, there is provided a method of performing uplink transmission in a user equipment (UE) in a wireless communication system. The method may include: receiving a first scheduling message with no new data indicator (NDI); performing first uplink transmission based on receiving the first scheduling message; receiving a second scheduling message including an NDI field; and performing i) retransmission of the first uplink transmission or ii) new uplink transmission based on the NDI field in the second scheduling message. Performing the retransmission of the first uplink transmission or the new uplink transmission may include: determining whether a value of the NDI field is toggled compared to a specific value while considering an NDI value for the first scheduling message as the specific value; performing the retransmission of the first uplink transmission based on the value of the NDI field being not toggled compared to the specific value; and performing the new uplink transmission based on the value of the NDI field being toggled compared to the specific value.

In another aspect of the present disclosure, there is provided a method of receiving uplink transmission from a UE by a base station (BS) in a wireless communication system. The method may include: transmitting a first scheduling message with no NDI to the UE; receiving first uplink transmission based on transmitting the first scheduling message; transmitting a second scheduling message including an NDI field to the UE; and receiving i) retransmission of the first uplink transmission or ii) new transmission from the UE based on the NDI field in the second scheduling message. Receiving the retransmission of the first uplink transmission or the new uplink transmission may include: determining whether a value of the NDI field is toggled compared to a specific value while considering an NDI value for the first scheduling message as the specific value; receiving the retransmission of the first uplink transmission based on the value of the NDI field being not toggled compared to the specific value; and receiving the new uplink transmission based on the value of the NDI field being toggled compared to the specific value.

In another aspect of the present disclosure, there is provided a UE configured to perform uplink transmission in a wireless communication system. The UE may include: at least one transceiver; at least one processor; and at least one computer memory operably connected to the at least one processor and configured to store instructions that, when executed, cause the at least one processor to perform operations. The operations may include: receiving a first scheduling message with no NDI; performing first uplink transmission based on receiving the first scheduling message; receiving a second scheduling message including an NDI field; and performing i) retransmission of the first uplink transmission or ii) new uplink transmission based on the NDI field in the second scheduling message. Performing the retransmission of the first uplink transmission or the new uplink transmission may include: determining whether a value of the NDI field is toggled compared to a specific value while considering an NDI value for the first scheduling message as the specific value; performing the retransmission of the first uplink transmission based on the value of the NDI field being not toggled compared to the specific value; and performing the new uplink transmission based on the value of the NDI field being toggled compared to the specific value.

In another aspect of the present disclosure, there is provided an apparatus for a UE. The apparatus may include: at least one processor; and at least one computer memory operably connected to the at least one processor and configured to store instructions that, when executed, cause the at least one processor to perform operations. The operations may include: receiving a first scheduling message with no NDI; performing first uplink transmission based on receiving the first scheduling message; receiving a second scheduling message including an NDI field; and performing i) retransmission of the first uplink transmission or ii) new uplink transmission based on the NDI field in the second scheduling message. Performing the retransmission of the first uplink transmission or the new uplink transmission may include: determining whether a value of the NDI field is toggled compared to a specific value while considering an NDI value for the first scheduling message as the specific value; performing the retransmission of the first uplink transmission based on the value of the NDI field being not toggled compared to the specific value; and performing the new uplink transmission based on the value of the NDI field being toggled compared to the specific value.

In another aspect of the present disclosure, there is provided a computer-readable storage medium. The computer-readable storage medium may be configured to store at least one computer program including instructions that, when executed by at least one processor, cause the at least one processor to perform operations for a UE. The operations may include: receiving a first scheduling message with no NDI; performing first uplink transmission based on receiving the first scheduling message; receiving a second scheduling message including an NDI field; and performing i) retransmission of the first uplink transmission or ii) new uplink transmission based on the NDI field in the second scheduling message. Performing the retransmission of the first uplink transmission or the new uplink transmission may include: determining whether a value of the NDI field is toggled compared to a specific value while considering an NDI value for the first scheduling message as the specific value; performing the retransmission of the first uplink transmission based on the value of the NDI field being not toggled compared to the specific value; and performing the new uplink transmission based on the value of the NDI field being toggled compared to the specific value.

In a further aspect of the present disclosure, there is provided a BS configured to receive uplink transmission from a UE in a wireless communication system. The BS may include: at least one transceiver; at least one processor; and at least one computer memory operably connected to the at least one processor and configured to store instructions that, when executed, cause the at least one processor to perform operations. The operations may include: transmitting a first scheduling message with no NDI to the UE; receiving first uplink transmission based on transmitting the first scheduling message; transmitting a second scheduling message including an NDI field to the UE; and receiving i) retransmission of the first uplink transmission or ii) new transmission from the UE based on the NDI field in the second scheduling message. Receiving the retransmission of the first uplink transmission or the new uplink transmission may include: determining whether a value of the NDI field is toggled compared to a specific value while considering an NDI value for the first scheduling message as the specific value; receiving the retransmission of the first uplink transmission based on the value of the NDI field being not toggled compared to the specific value; and receiving the new uplink transmission based on the value of the NDI field being toggled compared to the specific value.

In each aspect of the present disclosure, the first scheduling message may be related to a same hybrid automatic repeat and request (HARQ) process as a HARQ process related to the second scheduling message.

In each aspect of the present disclosure, the second scheduling message may include a HARQ process identifier of the HARQ process.

In each aspect of the present disclosure, the first scheduling message may include a random access response to the random access preamble.

In each aspect of the present disclosure, the random access preamble may be transmitted/received for a scheduling request.

In each aspect of the present disclosure, the random access preamble may be transmitted/received based on a physical downlink control channel (PDCCH) order.

In each aspect of the present disclosure, the second scheduling message may be received/transmitted on a PDCCH.

The foregoing solutions are merely a part of the examples of the present disclosure and various examples into which the technical features of the present disclosure are incorporated may be derived and understood by persons skilled in the art from the following detailed description.

Advantageous Effects

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

DESCRIPTION OF DRAWINGS

The accompanying drawings, which are included to provide a further understanding of the present disclosure, illustrate examples of implementations of the present disclosure and together with the detailed description serve to explain implementations of the present disclosure:

FIG. 5 illustrates a random access procedure applicable to implementation(s) of the present disclosure;

FIG. 13 illustrates PUSCH reception by a BS according to some implementations of the present disclosure.

BEST MODE

Figure 1:
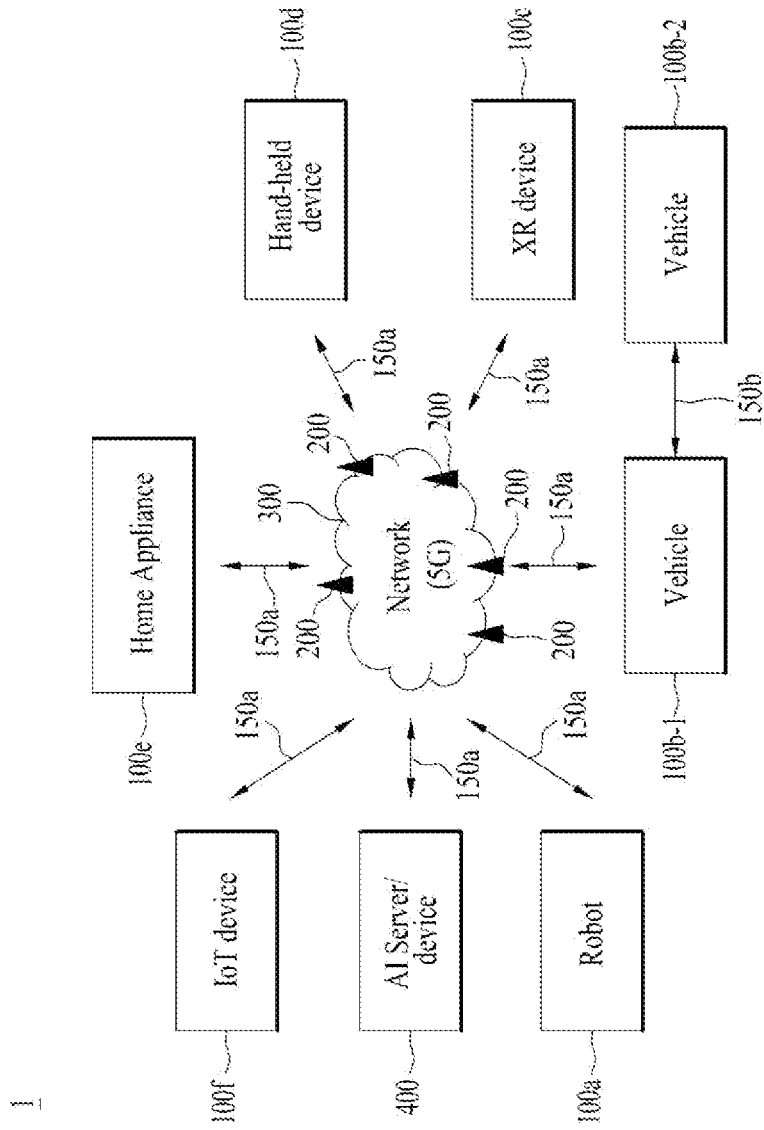
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts 01-DMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc.

are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resource elements (REs) that carry downlink control information (DCI), and the PDSCH refers to a set of REs that carry DL data. The PUCCH, PUSCH, and PRACH refer to a set of time-frequency REs that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In this specification, a radio resource (e.g., a time-frequency resource) scheduled or configured to the UE by the BS for transmission or reception of the PUCCH/PUSCH/PDSCH may be referred to as a PUCCH/PUSCH/PDSCH resource.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
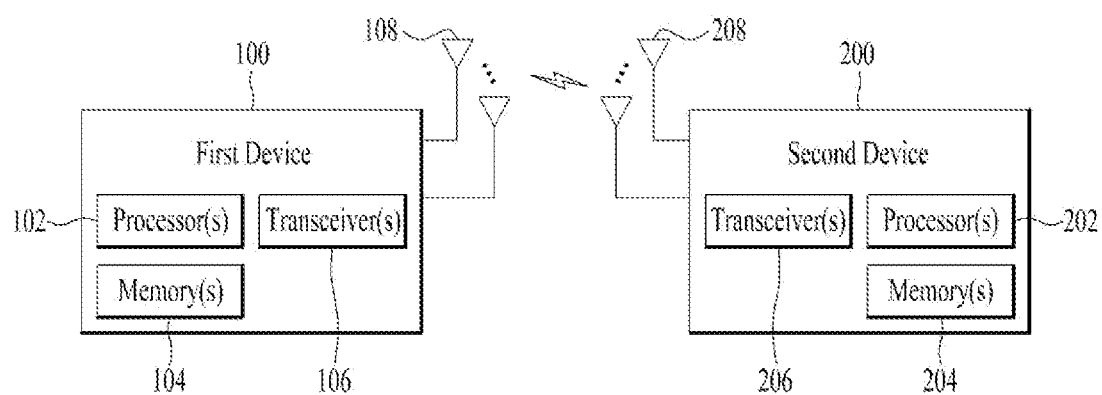
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names For example, the ZigBee technology may create a personal area network (PAN) related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
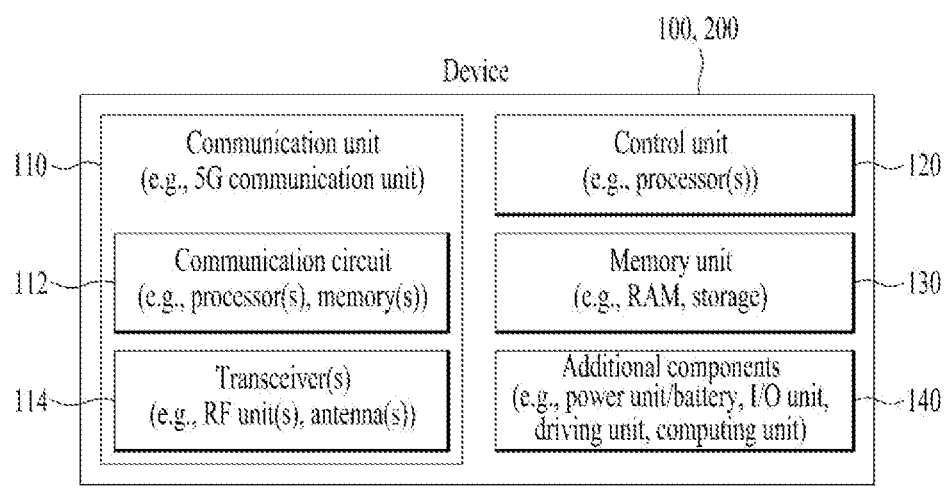
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
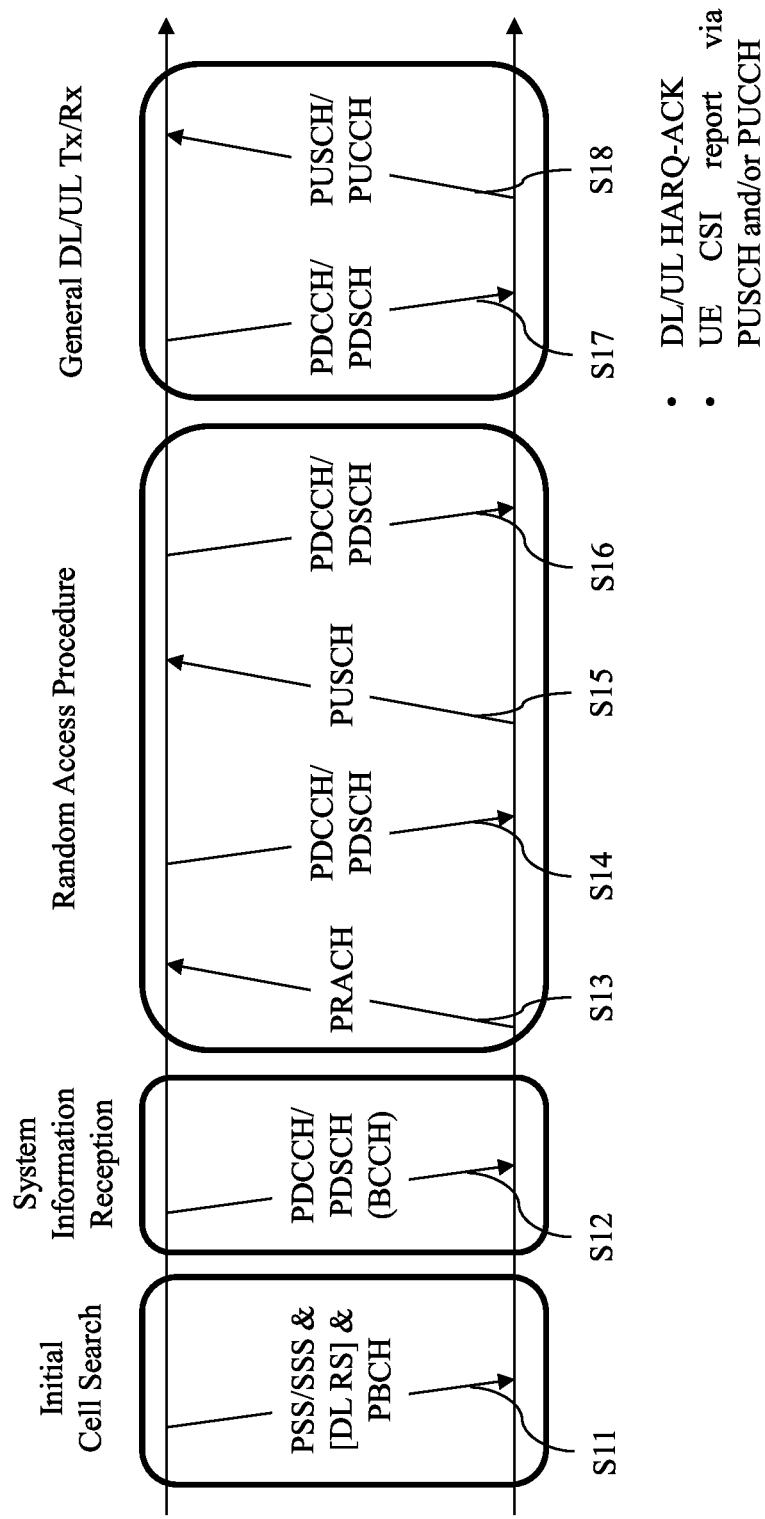
FIG. 4 illustrates physical channels used in a 3rd generation partnership project (3GPP)-based communication system, which is an example of a wireless communication system, and a signal transmission/reception process using physical channels.

FIG. 4 illustrates physical channels used in a 3GPP-based communication system, which is an example of a wireless communication system, and a signal transmission/reception process using physical channels.

A UE that is powered on again from a power-off state or a UE that has been disconnected from a wireless communication system performs an initial cell search procedure, such as search for a proper cell on which the UE is to camp and synchronization establishment with the cell or with a BS of the cell (S11). In the initial cell search procedure, the UE receives a synchronization signal block (SSB) (also called an SSB/PBCH block) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may also acquire broadcast information in a cell based on the PBCH. On the other hand, the UE may receive a downlink reference signal (DL RS) in the initial cell search procedure to check a DL channel state.

Upon completion of the initial cell search procedure, the UE may camp on the cell. After camping on the cell, the UE may monitor a PDCCH on the cell and receive downlink control information (DCI) carried by the PDCCH, thereby acquiring more specific system information (S12).

Next, the UE may perform a random access procedure to complete access to the BS (S13 to S16). For example, in the random access procedure, the UE may transmit a preamble on a physical random access channel (PRACH) (S13) and receive a random access response (RAR) to the preamble based on a PDCCH and a PDSCH corresponding to the PDCCH (S14). Upon failing to receive the RAR for the UE, the UE may re-attempt to transmit the preamble. In the case of contention-based random access, the UE may perform a contention resolution procedure including transmission of a PUSCH based on UL resource allocation included in the RAR (S15) and reception of a PDCCH and the PDSCH corresponding to the PDCCH (S16).

After the foregoing procedures, the UE may perform reception of the PDCCH/PDSCH (S17) and transmission of the PUSCH/PUCCH (S19) as a general UL/DL signal transmission process. Control information transmitted by the UE to the BS is collectively referred to as uplink control information (UCI). The UCI includes hybrid automatic repeat and request (HARQ) acknowledgement/negative-acknowledgement (ACK/NACK) (also called HARQ-ACK), scheduling request (SR), channel state information (CSI), etc. The CSI may include a channel quality indicator (CQI), a precoding matrix indicator (PMI), and/or a rank indicator. Generally, the UCI is transmitted on the PUCCH. However, when control information and traffic data need to be simultaneously transmitted, the UCI may be transmitted on the PUSCH. The UE may aperiodically transmit the UCI on the PUSCH based on the request/indication of a network.

FIG. 5 illustrates a random access procedure applicable to implementation(s) of the present disclosure. Particularly FIG. 5(a) illustrates a 4-step random access procedure and FIG. 5(b) illustrates a 2-step random access procedure.

The random access procedure may be variously used for initial access, UL synchronization adjustment, resource allocation, handover, radio link reconfiguration after failure of a radio link, location measurement, and the like. The random access procedure is classified into a contention-based procedure and a dedicated (i.e., non-contention-based) procedure. The contention-based random access procedure is normally used including initial access and the dedicated random access procedure is used for the case in which handover is needed, DL data reaches the network, location measurement is performed, and/or UL synchronization is reconfigured.

A PRACH preamble configuration to be used may be provided to the UE. Multiple RACH preambles (i.e., PRACH preamble formats) are defined by one or more RACH OFDM symbols and different cyclic prefixes (CPs) (and/or guard times). A PRACH preamble configuration for a cell provides the UE with available PRACH preamble format on the cell and RACH occasion(s). The RACH occasion refers to a time-frequency resource available for transmission/reception of the random access (RA) preamble(s). In some scenarios, one RACH occasion (RO) is configured with respect to all possible RA preambles transmittable on the cell by an RRC message (e.g., SIB2 of the cell). In other scenarios, SSBs may be selected in association with different beams and association between the SSB and the RO may be provided to the UE by the BS. SSBs associated with different DL beams of the cell may be identified by different SSB indexes and the different SSB indexes may represent different DL beams. The BS provides an available set of ROs for RA preamble transmission, and RO(s) associated with the SSB, through a PRACH configuration including the PRACH preamble configuration. For example, the UE may be provided with the number of SSBs associated with one RO by a higher layer (e.g., RRC) parameter SSB-perRACH-Occasion. Each of the SSBs transmitted on a cell is associated with one or more ROs based on the PRACH configuration for the cell. The BS may provide the number of preambles per SSB to the UE through the PRACH configuration. For example, the number of preambles per SSB may be provided by the value of a higher layer parameter cb-preamblePerSSB. The UE may determine the total number of preambles per RO and per SSB based on the value of SSB-perRACH-Occasion and the value of cb-preamblePerSSB. SSB indexes may be mapped to ROs in the following order:

first, in ascending order of preamble indexes in a single RO;

second, in ascending order of frequency resource indexes for frequency-multiplexed ROs;

third, in ascending order of time resource indexes for time-multiplexed ROs in an RACH slot; and/or fourth, in ascending order for RACH slots.

In some scenarios in which SSBs are associated with different DL beams, the UE may detect one or plural SSBs on a cell, select an SSB (randomly or based on reference signal received power (RSRP)) from among the detected SSBs, and determine an RO associated with the selected SSB through the PRACH configuration. The UE may transmit an RA preamble on the determined RO. The BS may monitor available ROs on a cell and may be aware of which SSB the UE that has transmitted the RA preamble has selected from among SSBs of different SSB indexes transmitted by the BS on the cell, based on an RO in which the RACH preamble has been received. The BS may determine an appropriate DL beam for the UE based on the SSB selected by the UE.

In the contention-based random access procedure, the UE selects an RA preamble. In the contention-based random access procedure, a plurality of UEs may simultaneously transmit the same RA preamble. Therefore, a contention resolution procedure is needed after the UEs simultaneously transmit the same RA preamble. In contrast, in the dedicated random access procedure, the UEs use RA preambles uniquely allocated thereto by the BS. Accordingly, a UE may perform the random access procedure without colliding with other UEs.

Referring to FIG. 5(a), the contention-based random access procedure includes the following 4 steps. Hereinafter, messages transmitted in Step 1 to Step 4 may be referred to as Msg1 to Msg4, respectively.

Step 1: The UE transmits an RA preamble on a PRACH.
Step 2: The UE receives an RAR on a PDSCH from the BS.
Step 3: The UE transmits UL data to the BS on a PUSCH based on the RAR. Here, the UL data includes a layer 2 and/or layer 3 message.
Step 4: The UE receives a contention resolution message on a PDSCH from the BS.

The UE may receive information regarding random access from the BS through system information. If random access is required, the UE transmits Msg1 (e.g., preamble) on the PRACH to the BS. The BS may distinguish between RA preambles through ROs, which are time/frequency resources on which the RA preambles are transmitted, and through random access preamble indexes (PIs). Upon receiving an RA preamble from the UE, the BS transmits an RAR message to the UE on a PDSCH. For reception of the RAR message, the UE monitors, within a preset time window (e.g., ra-ResponseWindow), an L1/L2 control channel (PDCCH) which is circular redundancy check (CRC)-masked with a random access radio network temporary identifier (RA-RNTI) including scheduling information for the RAR message. Upon receiving the scheduling information through the PDCCH CRC-masked with the RA-RNTI, the UE may receive the RAR message on a PDSCH indicated by the scheduling information. Then, the UE determines whether an RAR therefor is present in the RAR message. Determination as to whether the RAR for the UE is present may be confirmed by determining whether a random access preamble ID (RAPID) for the preamble transmitted by the UE is present. The index of the preamble transmitted by the UE and the RAPID may be the same. The RAR includes a corresponding random access preamble index, timing offset information for UL synchronization (e.g., timing advance command (TAC)), UL scheduling information for Msg3 transmission (e.g., UL grant), and UE temporary identification information (e.g., temporary cell RNTI (TC-RNTI)). Upon receiving the RAR, the UE transmits Msg3 on the PUSCH according to UL scheduling information and a timing offset value included in the RAR. Msg3 may include the ID of the UE (or global ID of the UE).

Msg3 may also include RRC connection request related information (e.g., RRCSetupRequest message) for initial access to the network. After receiving Msg3, the BS transmits Msg4, which is a contention resolution message, to the UE. When the UE receives the contention resolution message and successfully performs contention resolution, the TC-RNTI is changed to a C-RNTI. Msg4 may include the ID of the UE and/or RRC connection related information (e.g., RRCSetup message). If information transmitted through Msg3 is not equal to information received through Msg4 or if the UE fails to receive Msg4 for a certain period of time, the UE may determine that contention resolution fails and retransmit Msg3. If the UE successfully performs contention resolution, the UE may transition to an RRC_CONNECTED state. When the UE is in RRC_CONNECTED, RRC messages may be exchanged between the RRC layer of the UE and the RRC layer of the BS. That is, the UE in RRC_CONNECTED may imply a UE that has established an RRC connection with the BS.

The dedicated random access procedure includes the following three steps. Hereinbelow, messages transmitted in Step 0 to Step 2 will be referred to as Msg0 to Msg2, respectively. The dedicated random access procedure may be triggered at the UE by the BS using a PDCCH used for commanding RA preamble transmission (hereinafter, PDCCH order).

Step 0: The BS allocates an RA preamble to the UE through dedicated signaling.
Step 1: The UE transmits the RA preamble on a PRACH.
Step 2: The UE receives an RAR on a PDSCH.

The operations of Step 1 to Step 2 of the dedicated random access procedure may be equal to the operations of Step 1 to Step 2 of the contention-based random access procedure.

The NR system may require latency lower than that of a legacy system. Particularly, the 4-step random access procedure may be undesirable with respect to services sensitive to latency such as URLLC. In various scenarios of the NR system, a random access procedure of low latency may be required. When implementation(s) of the present disclosure are performed together with the random access procedure, the implementation(s) of the present disclosure may perform the following 2-step random access procedure together in order to reduce latency in the random access procedure.

Referring to FIG. 5(b), the 2-step random access procedure may include MsgA transmission from the UE to the BS and MsgB transmission from the BS to the UE. MsgA transmission may include RA preamble transmission on a PRACH and UL payload transmission on a PUSCH. In transmitting MsgA, the PRACH and the PUSCH may be subjected to time division multiplexing (TDM) for transmission. Alternatively, in transmitting MsgA, the PRACH and the PUSCH may be subjected to frequency division multiplexing (FDM) for transmission.

Upon receiving MsgA, the BS may transmit MsgB to the UE. MsgB may include an RAR for the UE.

An RRC connection request related message (e.g., RRCSetupRequest message) for making a request for connection establishment between the RRC layer of the BS and the RRC layer of the UE may be transmitted in the payload of MsgA. In this case, MsgB may be used for transmission of an RRC connection related information (e.g., RRCSetup message). Unlike this, the RRC connection request related message (e.g., RRCSetupRequest message) may be transmitted on a PUSCH transmitted based on a UL grant in MsgB. In this case, the RRC connection related information (e.g., RRC-Setup message) related to the RRC connection request may be transmitted on a PDSCH associated with PUSCH transmission after PUSCH transmission based on MsgB is performed.

Upon successfully receiving MsgB associated with MsgA transmitted by the UE, the UE may transition to an RRC_CONNECTED state. When the UE is in RRC_CONNECTED, RRC messages may be exchanged between the RRC layer of the UE and the RRC layer of the BS. That is, the UE in RRC_CONNECTED may imply a UE that has established an RRC connection with the BS.

Figure 6:
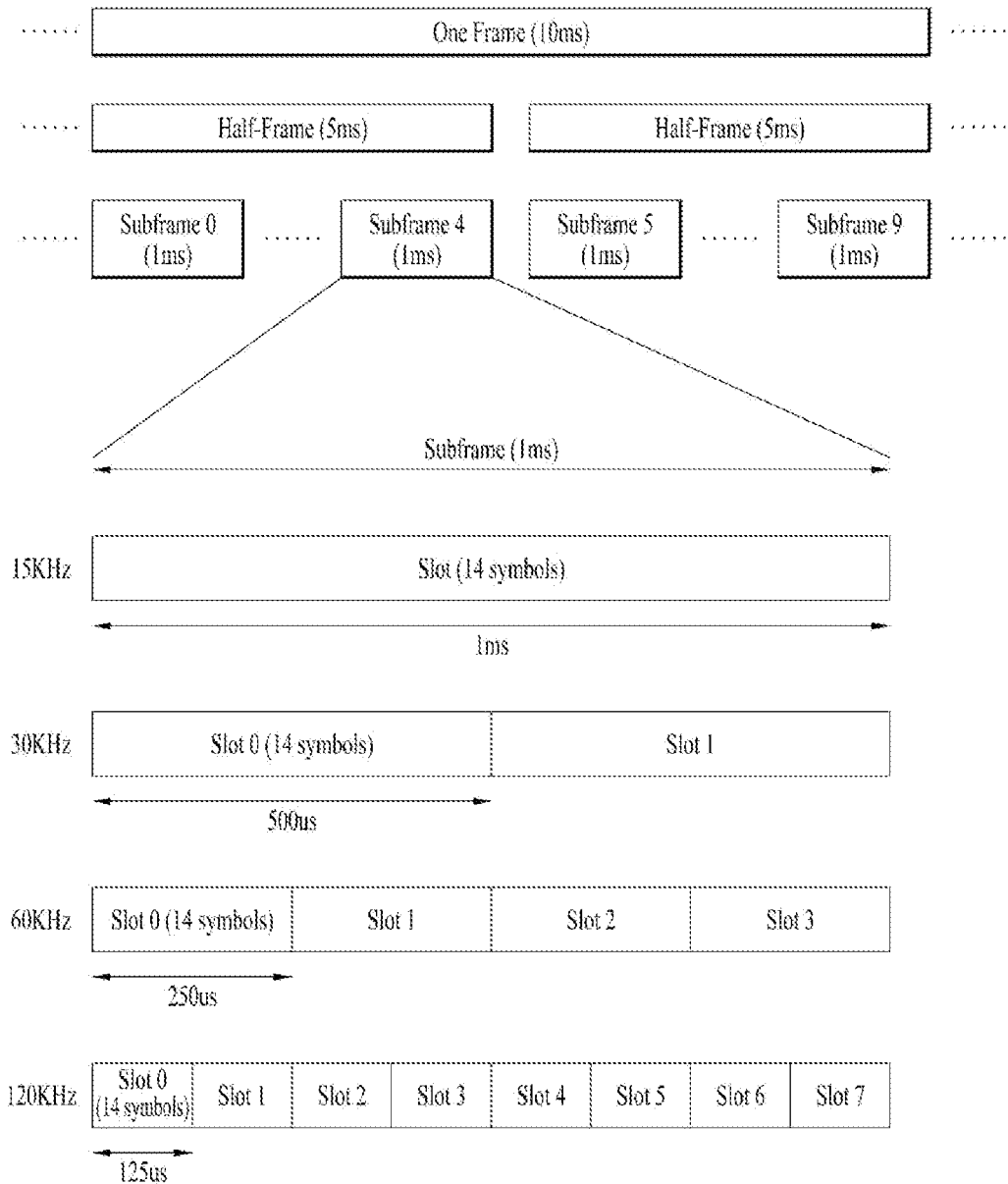
FIG. 6 illustrates an example of a frame structure used in a 3rd generation partnership project (3GPP)-based wireless communication system.

FIG. 6 illustrates an example of a frame structure used in a 3GPP-based wireless communication system.

The frame structure of FIG. 6 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 6, in the NR system, UL and DL transmissions are organized into frames. Each frame has a duration of $T_f = (\Delta f_{max} * N_f / 100) * T_c = 10$ ms and is divided into two half-frames of 5 ms each. A basic time unit for NR is $T_c = 1/(\Delta f_{max} * N_f)$ where $\Delta f_{max} = 480*10^3$ Hz and $N_f = 4096$. For reference, a basic time unit for LTE is $T_s = 1/(\Delta f_{ref} * N_{f,ref})$ where $\Delta f_{ref} = 15*10^3$ Hz and $N_{f,ref} = 2048$. $T_c$ and $T_f$ have the relationship of a constant $\kappa = T_s/T_f = 64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots $N^{subframe,u}_{slot}$ per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

For a search space configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

Figure 7:
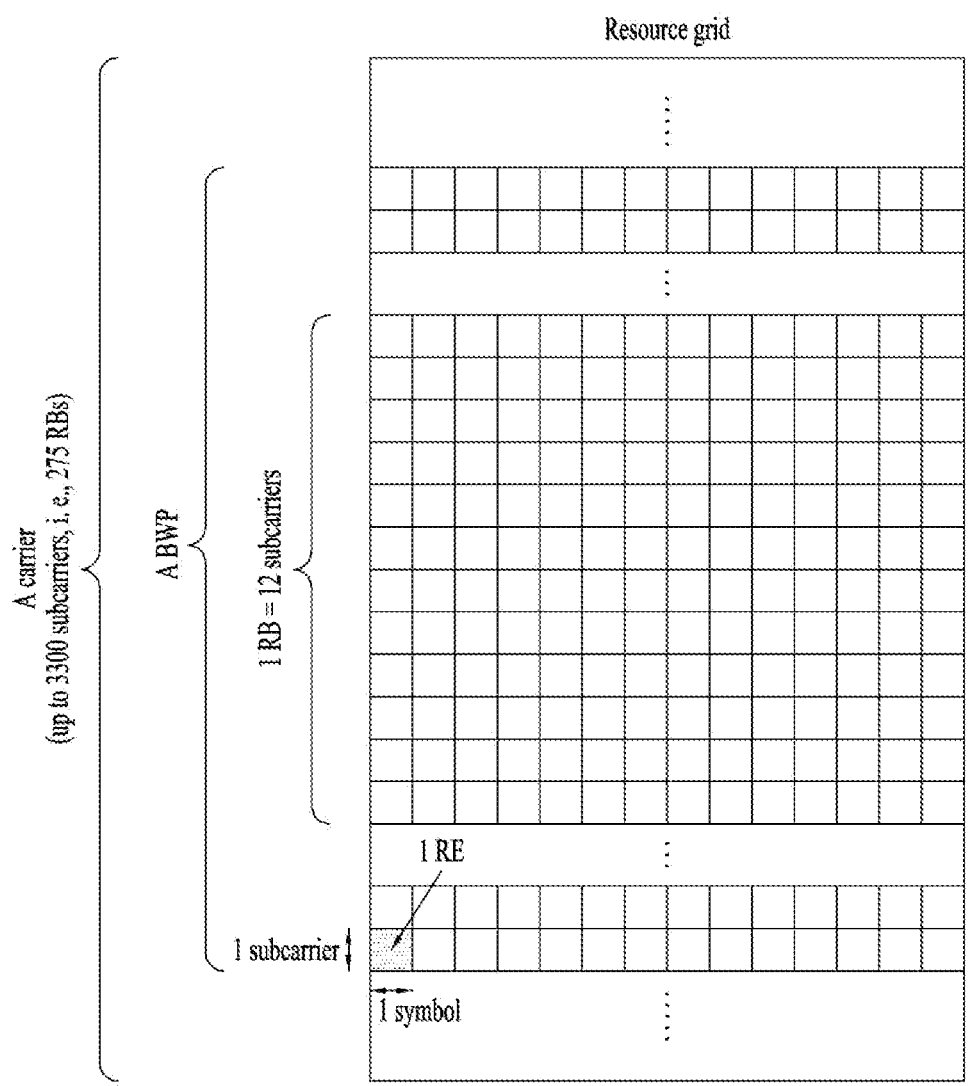
FIG. 7 illustrates a resource grid of a slot.

FIG. 7 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB} = n^u_{CRB} + N^{size,u}_{BWP,i}$ where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided the following parameters for the serving cell: i) an SCS; ii) a CP; iii) a CRB $N^{start}_{BWP} = O_{carrier} + RB_{start}$ and the number of contiguous RBs $N^{size}_{BWP} = L_{RB}$ provided by an RRC parameter locationAndBandwidth, which indicates an offset $RB_{set}$ and a length $L_{RB}$ as a resource indicator value (RIV) on the assumption of $N^{start}_{BWP} = 275$, and a value $O_{carrier}$ provided by an RRC parameter offsetToCarrier for the SCS; an index in the set of DL BWPs or UL BWPs; a set of BWP-common parameters; and a set of BWP-dedicated parameters.

Virtual resource blocks (VRBs) may be defined within the BWP and indexed from 0 to $N^{size,u}_{BWP,i}-1$, where i denotes a BWP number. The VRBs may be mapped to PRBs according to non-interleaved mapping. In some implementations, VRB n may be mapped to PRB n for non-interleaved VRB-to-PRB mapping.

Figure 8:
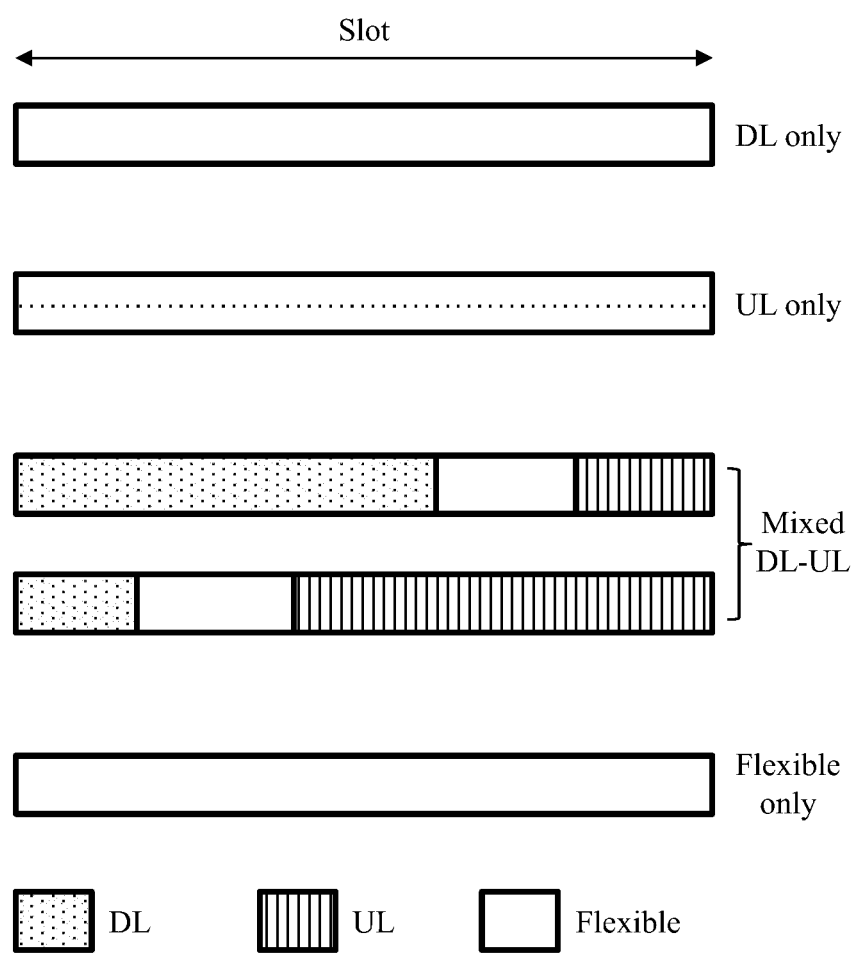
FIG. 8 illustrates slot structures used in a 3GPP-based system.

FIG. 8 illustrates slot structures used in a 3GPP-based system. In all 3GPP-based systems, for example, in an NR system, each slot may have a self-contained structure including i) a DL control channel, ii) DL or UL data, and/or iii) a UL control channel. For example, the first N symbols in a slot may be used to transmit the DL control channel (hereinafter, DL control region) and the last M symbols in a slot may be used to transmit the UL control channel (hereinafter, UL control region), where N and M are integers other than negative numbers. A resource region (hereinafter, data region) between the DL control region and the UL control region may be used to transmit DL data or UL data. Symbols in a single slot may be divided into group(s) of consecutive symbols that may be used as DL symbols, UL symbols, or flexible symbols. Hereinbelow, information indicating how each symbol in slot(s) is used will be referred to as a slot format. For example, which symbols in slot(s) are used for UL and which symbols in slot(s) are used for DL may be defined by a slot format.

When a BS intends to operate a serving cell in time division duplex (TDD) mode, the BS may configure a pattern for UL and DL allocation for the serving cell through higher layer (e.g., RRC) signaling. For example, the following parameters may be used to configure a TDD DL-UL pattern:
- dl-UL-TransmissionPeriodicity that provides a periodicity of the DL-UL pattern;
- nrofDownlinkSlots that provides the number of consecutive full DL slots at the beginning of each DL-UL pattern, where the full DL slots are slots having only DL symbols;
- nrofDownlinkSymbols that provides the number of consecutive DL symbols at the beginning of a slot immediately following the last full DL slot;
- nrofUplinkSlots that provides the number of consecutive full UL slots at the end of each DL-UL pattern, where the full UL slots are slots having only UL symbols; and
- nrofUplinkSymbols that provides the number of consecutive UL symbols in the end of a slot immediately preceding the first full UL slot.

The remaining symbols that are not configured as either DL symbols or UL symbols among symbols in the DL-UL pattern are flexible symbols.

If the UE is provided with a configuration for the TDD DL-UL pattern, i.e., a TDD UL-DL configuration (e.g., tdd-UL-DL-ConfigurationCommon, or tdd-UL-DLConfigurationDedicated), through higher layer signaling, the UE sets a slot format per slot over a number of slots based on the configuration.

For symbols, although there may be various combinations of DL symbols, UL symbols, and flexible symbols, a predetermined number of combinations may be predefined as slot formats and the predefined slot formats may be respectively identified by slot format indexes. The following table shows a part of the predefined slot formats. In the table below, D denotes a DL symbol, U denotes a UL symbol, and F denotes a flexible symbol.

TABLE 3

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | F | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... | | | | | | | | | | | | | | |

To indicate which slot format is used in a specific slot among the predefined slot formats, the BS may configure a set of slot format combinations applicable to a corresponding serving cell per cell with respect to a set of serving cells through higher layer (e.g., RRC) signaling and cause the UE to monitor a group-common PDCCH for slot format indicator(s) (SFI(s)) through higher layer (e.g., RRC) signaling. Hereinafter, DCI carried by the group-common PDCCH for the SFI(s) will be referred to as SFI DCI. DCI format 2_0 is used as the SFI DCI. For example, for each serving cell in a set of serving cells, the BS may provide the UE with the (start) position of a slot format combination ID (i.e., SFI-index) for a corresponding serving cell in the SFI DCI, a set of slot format combinations applicable to the serving cell, and a reference subcarrier spacing configuration for each slot format in a slot format combination indicated by an SFI-index value in the SFI DCI. One or more slot formats are configured for each slot format combination in the set of the slot format combinations and the slot format combination ID (i.e., SFI-index) is assigned to the slot format combination. For example, when the BS intends to configure the slot format combination with N slot formats, N slot format indexes among slot format indexes for the predefined slot formats (e.g., see Table 3) may be indicated for the slot format combination. In order to configure the UE to monitor the group-common PDCCH for the SFIs, the BS informs the UE of an SFI-RNTI corresponding to an RNTI used for an SFI and the total length of a DCI payload scrambled with the SFI-RNTI. Upon detecting the PDCCH based on the SFI-RNTI, the UE may determine slot format(s) for the corresponding serving cell from an SFI-index for the serving cell among SFI-indexes in the DCI payload in the PDCCH.

Symbols indicated as flexible symbols by the TDD DL-UL pattern configuration may be indicated as UL symbols, DL symbols, or flexible symbols by the SFI DCI. Symbols indicated as the DL/UL symbols by the TDD DL-UL pattern configuration are not overridden as the UL/DL symbols or the flexible symbols by the SFI DCI.

If the TDD DL-UL pattern is not configured, the UE determines whether each slot is used for UL or DL and determines symbol allocation in each slot based on the SFI DCI and/or on DCI for scheduling or triggering DL or UL signal transmission (e.g., DCI format 1_0, DCI format 1_1, DCI format 1_2, DCI format 0_0, DCI format 0_1, DCI format 0_2, or DCI format 2_3).

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

NR frequency bands are defined as two types of frequency ranges, i.e., FR1 and FR2. FR2 is also referred to as millimeter wave (mmW). The following table shows frequency ranges within which NR may operate.

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including resource allocation information on the DL-SCH is called PDSCH scheduling DCI, and DCI including resource allocation information on the UL-SCH is called PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

- Scheduling request (SR): Information that is used to request a UL-SCH resource.
- Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (LI). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 5.

(0) PUCCH format 0 (PF0 or F0)
Supported UCI payload size: up to K bits (e.g., K=2)
Number of OFDM symbols constituting a single PUCCH: 1 to X symbols (e.g., X=2)
Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.
Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH format 1 (PF1 or F1)
Supported UCI payload size: up to K bits (e.g., K=2)
Number of OFDM symbols constituting a single PUCCH: Y to Z symbols (e.g., Y=4 and Z=14)
Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.
Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH format 2 (PF2 or F2)
Supported UCI payload size: more than K bits (e.g., K=2)
Number of OFDM symbols constituting a single PUCCH: 1 to X symbols (e.g., X=2)
Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of 1/3. A pseudo noise (PN) sequence is used for a DMRS sequence. Frequency hopping may be activated for 2-symbol PUCCH format 2.
Configuration for PUCCH format 2 includes the following parameters for a corresponding PUCCH resource: the number of PRBs, the number of symbols for PUCCH transmission, and/or the first symbol for PUCCH transmission.

(3) PUCCH format 3 (PF3 or F3)
Supported UCI payload size: more than K bits (e.g., K=2)
Number of OFDM symbols constituting a single PUCCH: Y to Z symbols (e.g., Y=4 and Z=14)
Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).
Configuration for PUCCH format 3 includes the following parameters for a corresponding PUCCH resource: the number of PRBs, the number of symbols for PUCCH transmission, and/or the first symbol for PUCCH transmission.

(4) PUCCH format 4 (PF4 or F4)
Supported UCI payload size: more than K bits (e.g., K=2)
Number of OFDM symbols constituting a single PUCCH: Y to Z symbols (e.g., Y=4 and Z=14)
Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.
Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N^{PUCCH}_{symb}$ | Number of bits | Usage | Etc. |
| --- | --- | --- | --- | --- |
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |

TABLE 5-continued

| PUCCH format | Length in OFDM symbols $N^{PUCCH}_{symb}$ | Number of bits | Usage | Etc. |
|---|---|---|---|---|
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.—PUCCH resource set #0, if the number of UCI bits=<2

PUCCH resource set #1, if 2<the number of UCI bits=<$N_1$
    . . .
    PUCCH resource set #(K−1), if $N_{K-2}$<the number of UCI bits=<$N_{K-1}$ Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 6).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

Resource Allocation by PDCCH: Dynamic Grant/Assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 9:
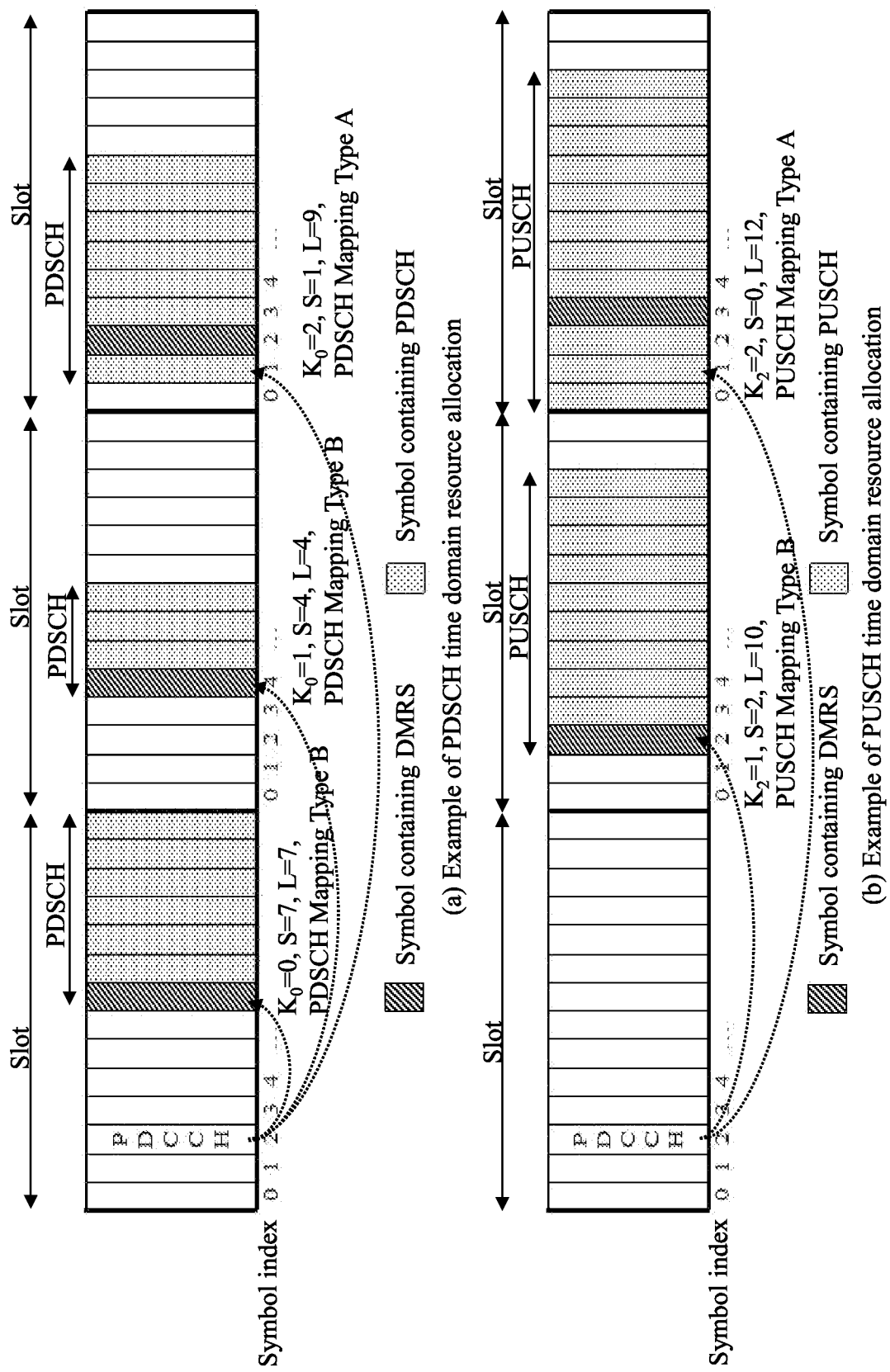
FIG. 9 illustrates an example of physical downlink shared channel (PDSCH) time domain resource assignment (TDRA) caused by a physical downlink control channel (PDCCH) and an example of physical uplink shared channel (PUSCH) TDRA caused by the PDCCH.

FIG. 9 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. There are two PDSCH/PUSCH mapping types: one is mapping type A and the other is mapping type B. In the case of PDSCH/PUSCH mapping type A, a DMRS is mapped to a PDSCH/PUSCH resource with respect to the start of a slot. One or two of the symbols of the PDSCH/PUSCH resource may be used as DMRS symbol(s) according to other DMRS parameters. For example, in the case of PDSCH/PUSCH mapping type A, the DMRS is located in the third symbol (symbol #2) or the fourth symbol (symbol #3) in the slot according to RRC signaling. In the case of PDSCH/PUSCH mapping type B, a DMRS is mapped with respect to the first OFDM symbol of a PDSCH/PUSCH resource. One or two symbols from the first symbol of the PDSCH/PUSCH resource may be used as DMRS symbol(s) according to other DMRS parameters. For example, in the case of PDSCH/PUSCH mapping type B, the DMRS is located at the first symbol allocated for the PDSCH/PUSCH. In the present disclosure, the PDSCH/PUSCH mapping type may be referred to as a mapping type or a DMRS mapping type. For example, in this specification, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:

cs-RNTI corresponding to a CS-RNTI for retransmission;
periodicity corresponding to a periodicity of configured grant Type 1;
timeDomainOffset indicating an offset of a resource with respect to system frame number (SFN)=0 in the time domain;
timeDomainAllocation value m that provides a row index m+1 pointing to the allocation table, indicating a combination of the start symbol S, the length L, and the PUSCH mapping type;
frequencyDomainAllocation that provides frequency domain resource allocation; and
mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+ N*periodicity) modulo (1024*numberOfSlotsPerFrame* numberOfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:
cs-RNTI corresponding to a CS-RNTI for activation, deactivation, and retransmission; and
periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying: [(SFN* numberOfSlotsPerFrame*numberOfSym-bolsPerSlot)+(slot number in the frame* numberOfSymbolsPerSlot)+symbol number in the slot]=[(SFN$_{start\ time}$*numberOfSlotsPerFrame*numberOfSymbolsPerSlot+slot$_{start\ time}$*numberOfSymbolsPerSlot+symbol$_{start\ time}$)N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:

cs-RNTI corresponding to a CS-RNTI for activation, deactivation, and retransmission;
  nrofHARQ-Processes that provides the number of HARQ processes for SPS;
  periodicity that provides a periodicity of configured DL assignment for SPS.

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start\ time}$+slot$_{start\ time}$)+N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 7 and Table 8. Table 7 shows an example of special fields for DL SPS and UL grant Type 2 scheduling activation PDCCH validation, and Table 8 shows an example of special fields for DL SPS and UL grant Type 2 scheduling release PDCCH validation.

TABLE 6

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 7

|  | DCI format 0_0 | DCI format 1_0 |
|---|---|---|
| HARQ process number | set to all '0's | set to all '0's |
| Redundancy version | set to '00' | set to '00' |

TABLE 7-continued

|  | DCI format 0_0 | DCI format 1_0 |
|---|---|---|
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

Figure 10:
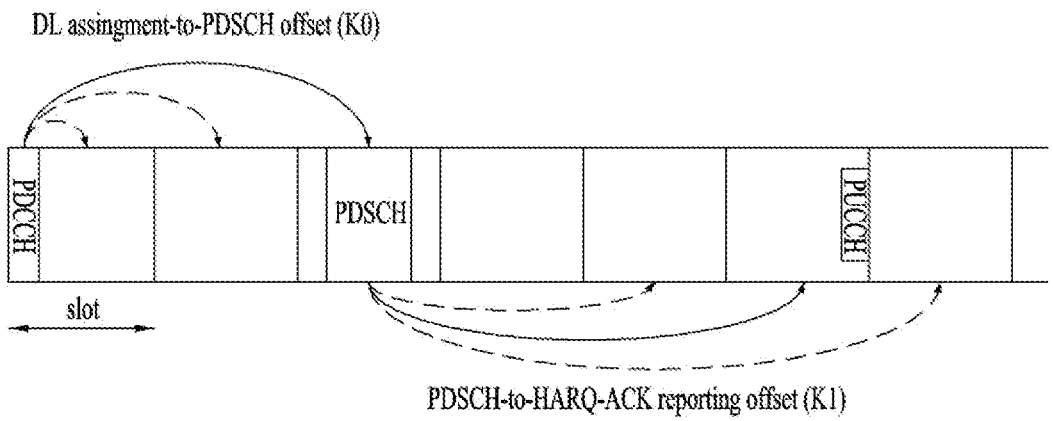
FIG. 10 illustrates a hybrid automatic repeat request-acknowledgement (HARQ-ACK) transmission/reception procedure.

FIG. 10 illustrates a HARQ-ACK transmission/reception procedure.

Referring to FIG. 10, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

FDRA: FDRA indicates an RB set allocated to the PDSCH.
  TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.
  PDSCH-to-HARQ_feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as a semi-static HARQ-ACK codebook and a dynamic HARQ-ACK codebook according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k∈{1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n−k). For example, when k∈{1, 2, 3, 4, 5, 6, 7, 8}, the HARQ-ACK information of slot #n may include HARQ-ACK corresponding to slot #(n−8) to slot #(n−1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. In the case of the dynamic HARQ-ACK codebook, the HARQ-ACK payload size that the UE is to report may be dynamically changed by the DCI etc. In the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides parameters (e.g., CORESET #0 configuration) for monitoring a PDCCH for scheduling a PDSCH carrying system information block 1 (SIB1) to the UE. The PBCH may also indicate that there is no associated SIB1. In this case, the UE may be provided with not only a frequency range in which the UE may assume that there is no SSB associated with SSB1 but also other frequencies to search for an SSB associated with SIB1. CORESET #0, which is a CORESET for scheduling SIB1 at least, may be configured by the MIB or dedicated RRC signaling.

A set of PDCCH candidates monitored by the UE is defined in terms of PDCCH search space sets. The search space set may be a common search space (CSS) set or a UE-specific search space (USS) set. Each CORESET configuration is associated with one or more search space sets, and each search space set is associated with one CORESET configuration. The search space set is determined based on the following parameters provided by the BS to the UE.

controlResourceSetId: an identifier for identifying a CORESET p associated with a search space set s.

monitoringSlotPeriodicityAndOffset: a PDCCH monitoring periodicity of slots $k_s$ and a PDCCH monitoring offset of $o_s$ slots to configure slots for PDCCH monitoring.

duration: a duration of $T_s<k_s$ slots indicating a number of slots in which the search space set s exists.

monitoringSymbolsWithinSlot: a PDCCH monitoring pattern within a slot, indicating first symbol(s) of the CORESET within a slot for PDCCH monitoring.

nrofCandidates: a number of PDCCH candidates per CCE aggregation level.

searchSpaceType: an indication that search space set s is either a CCE set or a USS set.

The parameter monitoringSymbolsWithinSlot may indicate the first symbol(s) for PDCCH monitoring in the slots configured for PDCCH monitoring (e.g., see monitoringSlotPeriodicityAndOffset and duration). For example, if monitoringSymbolsWithinSlot is configured with 14 bits, the most significant (left) bit represents the first OFDM symbol of a slot, and the second most significant (left) bit represents the second OFDM symbol of the slot. In this way, the bits of monitoringSymbolsWithinSlot may represent 14 OFDM symbols of the slot, respectively. For example, among the bits of monitoringSymbolsWithinSlot, bit(s) set to 1 may identify the first symbol(s) of a CORESET in a slot.

A UE monitors PDCCH candidates in PDCCH monitoring occasions only. The UE determines a monitoring occasion on an active DL BWP from the PDCCH monitoring periodicity, the PDCCH monitoring offset, and the PDCCH monitoring pattern within a slot. In some implementations, for search space set s, the UE determines that a PDCCH monitoring occasion(s) existing in a slot with number $n^u_{s,f}$ in a frame with number $n_f$ if $(n_f \cdot N^{frame,u}_{slot}+n^u_{s,f}-o_s)$ mod $k_s=0$. The UE monitors PDCCH candidates for search space set s for $T_s$ consecutive slots, starting from slot $n^u_{s,f}$ and does not monitor PDCCH candidates for search space set s for the next $k_s-T_s$.

The following table shows search space sets, related RNTIs, and use cases thereof.

TABLE 8

| Search Space Set | RNTI | Use Case |
| --- | --- | --- |
| Type0-PDCCH CSS set | SI-RNTI on a primary cell | SIB Decoding |
| Type0A-PDCCH CSS set | SI-RNTI on a primary cell | SIB Decoding |
| Type1-PDCCH CSS set | RA-RNTI or TC-RNTI on a primary cell | Msg2, Msg4 decoding in RACH |
| Type2-PDCCH CSS set | P-RNTI on a primary cell | Paging Decoding |
| Type3-PDCCH CSS set | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| USS set | C-RNTI, or MCS-C-RNTI, or CS-RNTI(s) | User specific PDSCH decoding |

The following table shows DCI formats carried by a PDCCH.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of PRB(s) and OFDM symbol(s) where UE cancels the corresponding UL transmission from the UE |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. For a CSS, DCI format 0_0 and DCI format 1_0 have fixed sizes after the BWP size is initially given by RRC. For a USS, DCI format 0_0 and DCI format 1_0 are fixed in size in fields other than a frequency domain resource assignment (FDRA) field, and the FDRA field may vary in size by configuration of a related parameter by the BS. In DCI format 0_1 and DCI format 1_1, the size of the DCI field may be changed by various RRC reconfigurations by the BS. DCI format 2_0 may be used to provide dynamic slot format information (e.g., SFI DCI) to the UE, DCI format 2_1 may be used to provide DL pre-emption information to the UE, and DCI format 2_4 may be used to indicate a UL resource on which the UE needs to cancel UL transmission.

For example, each of DCI format 0_0 and DCI format 0_1 may include an FDRA field for scheduling a PUSCH, and each of DCI format 1_0 and DCI format 1_1 may include an FDRA field for scheduling a PDSCH. The number of bits in the FDRA field of each of DCI format 0_0 and DCI format 0_1 may be determined based on $N_{RB}^{UL,BWP}$, which is the size of an active or initial UL BWP. The number of bits in the FDRA field of each of DCI format 1_0 and DCI format 1_1 may be determined based on $N_{RB}^{DL,BWP}$, which is the size of an active or initial DL BWP.

One of the representative scenarios of the next system, URLLC has the low-latency and high-reliability requirements of a user-plane delay of 0.5 ms and transmission of X bytes of data within 1 ms at or below an error rate of $10^{-5}$. In general, eMBB is characterized by a large traffic capacity, a file size equal to or less than tens to hundreds of bytes, and sporadic occurrence. Therefore, eMBB requires transmission at a maximum transmission rate with minimum overhead of control information, whereas URLLC requires a relatively short transmission duration (e.g., 2 symbols) and a reliable transmission method.

One of the representative scenarios of the next system, URLLC has the low-latency and high-reliability requirements of a user-plane delay of 0.5 ms and transmission of X bytes of data within 1 ms at or below an error rate of $10^{-5}$. In general, eMBB is characterized by a large traffic capacity, a file size equal to or less than tens to hundreds of bytes, and sporadic occurrence. Therefore, eMBB requires transmission at a maximum transmission rate with minimum overhead of control information, whereas URLLC requires a short scheduling time unit and a reliable transmission method.

In some implementations of the present disclosure, a slot or a mini-slot may be defined based on the number of symbols for convenience. For example, the slot may mean a time duration consisting of the maximum number of symbols allowed to be included in one slot, and the mini-slot may mean a time duration consisting of symbol(s) less than the maximum number of symbols.

Alternatively, the slot and mini-slot may be defined based on mapping of a DMRS symbol used for transmission or reception. For example, when the position of the DMRS symbol used for transmission or reception is determined with respect to the start of the slot, a time duration consisting of a predetermined number (e.g., 14) of symbols from a time point that serves as the reference for the position of the DMRS symbol may correspond to the slot. When the position of the DMRS symbol used for transmission or reception is determined based on a time point at which the corresponding transmission or reception starts, a time duration consisting of contiguous symbol(s) from the start time of the transmission or reception to the end time thereof may correspond to the mini-slot.

The UE may be allocated a UL resource in a higher layer message (e.g., RAR MAC control element (CE)) during a random access procedure and perform PUSCH transmission on the UL resource. In the legacy LTE technology, the BS uses a separate physical channel (e.g., physical HARQ indicator channel (PHICH)) to transmit a response to transmission of a UL-SCH. However, in some scenarios, for example, in a next-generation system such as NR, the BS may allow the UE to indirectly infer a response to previous PUSCH transmission from a scheduling message transmitted over a PDCC without use of any separate physical channel Scheduling information received by the UE from the BS in the higher layer message and scheduling information received by the UE from the BS over the PDCCH may contain different information for different usage. If the BS intends to instruct the UE to retransmit a PUSCH, which was transmitted based on a higher layer scheduling message (e.g., RAR), over a PDCCH for more efficient management, alignment may be necessary for omitted information or information carried by other means.

For example, when the UE transmits a PUSCH to the BS on a resource allocated in a higher layer scheduling message (e.g., RAR) and receives a PDCCH, the UE may transmit a new PUSCH or retransmit the previously transmitted PUSCH based on the PDCCH. In this case, if specific information included in the higher layer scheduling message or PDCCH is omitted or missing, there may be a problem that the UE is incapable of determining whether to perform the PUSCH transmission or retransmission.

The present disclosure addresses a method of solving problems that may occur when a UE performs PUSCH retransmission. That is, according to the present disclosure, when the UE intends to retransmit a PUSCH, which was transmitted based on a higher layer scheduling message, based on a PDCCH, the UE may be allowed to process omitted/missing or unnecessary information in the higher layer scheduling message, thereby solving the problems that may occur in the PUSCH retransmission.

For example, an RAR grant used in the random access procedure may be considered as one of the higher layer scheduling messages. Table 10 shows fields of the RAR grant defined in 3GPP TS 38.213 V15.5.0.

TABLE 10

| RAR grant field | Number of bits |
| --- | --- |
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |

Table 11 shows fields of DCI format 0_0 used in UL resource scheduling defined in 3GPP TS 38.212 V15.5.0.

TABLE 11

- Identifier for DCI formats - 1 bit
  - The value of this bit field is always set to 0, indicating an UL DCI format
- Frequency domain resource assignment - $[\log_2(N_{RB}^{UL,BWP}(N_{RB}^{UL,BWP}+1)/2)]$ bits where $N_{RB}^{UL,BWP}$ is defined in subclause 7.3.1.0
  - For PUSCH hopping with resource allocation type 1:
    - $N_{UL\_hop}$ MSB bits are used to indicate the frequency offset according to Subclause 6.3 of [6, TS 38.214], where $N_{UL\_hop}$ = 1 if the higher layer parameter frequencyHoppingOffsetLists contains two offset values and $N_{UL\_hop}$ = 2 if the higher layer parameter frequencyHoppingOffsetLists contains four offset values
    - $[\log_2(N_{RB}^{UL,BWP}(N_{RB}^{UL,BWP}+1)/2)]$ - $N_{UL\_hop}$ bits provides the frequency domain resource allocation according to Subclause 6.1.2.2.2 of [6, TS 38.214]
  - For non-PUSCH hopping with resource allocation type 1:
    - $[\log_2(N_{RB}^{UL,BWP}(N_{RB}^{UL,BWP}+1)/2)]$ bits provides the frequency domain resource allocation according to Subclause 6.1.2.2.2 of [6, TS 38.214]
- Time domain resource assignment - 4 bits as defined in Subclause 6.1.2.1 of [6, TS 38.214]
- Frequency hopping flag - 1 bit according to Table 7.3.1.1.1-3, as defined in Subclause 6.3 of [6, TS 38.214]
- Modulation and coding scheme - 5 bits as defined in Subclause 6.1.4.1 of [6, TS 38.214]
- New data indicator - 1 bit
- Redundancy version - 2 bits as defined in Table 7.3.1.1.1-2
- HARQ process number - 4 bits
- TPC command for scheduled PUSCH-2 bits as defined in Subclause 7.1.1 of [5, TS 38.213]
- Padding bits, if required.
- UL/SUL indicator - 1 bit for UEs configured with supplementaryUplink in ServingCellConfig in the cell as defined in Table 7.3.1.3.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
  - If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
  - If the UL/SUL indicator is not present in DCI format 0_0, the corresponding PUSCH scheduled by the DCI format 0_0 is for the UL or SUL for which high layer parameter pucch-Config is configured.

As may be seen from Tables 10 and 11, the RAR grant may include a small number of fields compared to DCI to simplify and statically transfer information provided by the DCI, and the fields of the RAR grant may have a fixed bit size. For the RAR grant, some of the information elements that may be provided by the DCI may be omitted or altered. However, since specific information provided by the DCI may affect not only corresponding transmission but also subsequent transmission, the omitted or altered information may cause problems in the subsequent transmission.

The present disclosure addresses problems that may occur when a UE performs UL transmission based on a plurality of scheduling messages with different configurations and solutions therefor.

The plurality of scheduling messages may include a scheduling message transmitted through higher layer signaling such as an RAR grant, a configured grant, etc. and a scheduling message transmitted through L1 signaling, i.e., physical layer signaling such as DCI format 0_0, DCI format 0_1, etc.

In the present disclosure, implementations of the present disclosure are described based on UL scheduling messages and UL transmission for convenience of explanation. The above-described problems may also occur for DL scheduling messages and DL transmission. Therefore, the implementations of the present disclosure are not limited to UL channels/signals and may also be applied to DL channels/signals or other wireless transmissions.

A new data indicator (NDI) may be included in or omitted from a scheduling message depending on to the type and transmission method of the corresponding scheduling message. Hereinafter, a scheduling message including an NDI will be referred to as "NDI-included scheduling", and a scheduling message including no NDI will be referred to as "NDI missing scheduling". For example, an RAR grant may correspond to NDI-included scheduling, and DCI formats 0_0, 1_0, and 2_0 may correspond to NDI missing scheduling.

The NDI is information indicating a relationship between the current transmission and the previous transmission and a relationship between the current transmission and the next transmission. For example, when an NDI value in a scheduling message is toggled compared to a previous NDI value for the same HARQH process, the UE and BS may determine that new transmission is indicated. On the other hand, when the NDI value is not toggled, the UE and BS may determine that retransmission is indicated. The above operation is necessary for HARQ combining through retransmission. That is, if the UE always transmits only a new TB or always transmits information different from a previously transmitted TB, the NDI may not need to be considered. For example, if there is no previously transmitted TB as in the initial access, the UE may perform UL transmission on the assumption that a UL scheduling message first received during the initial access procedure always indicates new TB transmission.

However, there may arise problems in retransmission cases: for example, when a PUSCH allocated by NDI missing scheduling needs to be retransmitted; or when a previously transmitted PUSCH needs to be retransmitted based on NDI missing scheduling. For example, when the UE is allocated PUSCH transmission in NDI missing scheduling and then performs transmission (previous transmission), the UE may not know whether an NDI included in NDI-included scheduling, which will be provided later to the UE, indicates retransmission of the previous transmission or new transmission. Such ambiguity between the BS and UE may result in wasting several scheduling messages, which may cause an increase in latency and lower overall system performance. When the random access procedure is initiated by beam failure, similar problems may occur. In some scenarios, to solve these problems, a specific RNTI (e.g., temporary C-RNTI (TC-RNTI)) may be used for DCI indicating retransmission (hereinafter retransmission DCI), or a time window for transmitting the retransmission DCI may be configured. However, it is difficult to apply the same method to a random access procedure for requesting UL resources or a RACH process such as contention-free RACH (hereinafter, CF-RACH) except for the initial access. Considering that RNTI values available to the BS are limited, if an additional RNTI to be used for retransmission DCI is allocated to each of all the UEs connected to the BS in order to solve the NDI missing related problem, this may cause unnecessary consumption of the RNTI values available to the BS. In addition, if a timer-based operation for distinguishing new transmission and retransmission based on a timer is applied to an access process for requesting general UL resources, a time corresponding to the duration of the timer needs to pass in order to use a corresponding HARQ process for the new transmission, and thus, it may cause a delay in the new transmission. Such a transmission delay may be critical to URLLC services. Therefore, NDI missing may still be problematic for the random access procedure performed to request UL resources or the CF-RACH except for the initial access.

In some scenarios, when the UE receives NDI missing scheduling, information between the UE and the BS may be aligned by inheriting and using a previous NDI value without any updates. However, for the NDI missing scheduling, considering that the CF-RACH may occur when the UE is out of synchronization, it may be difficult to assume that the UE has correctly received all previous scheduling messages even if the NDI value of the previous transmission is inherited and used. For example, when the CF-RACH is performed by a PDCCH order due to frequent scheduling failures, it may be difficult to determine that DCI previously transmitted by the BS has been correctly received. In this case, it is not appropriate to inherit and use the previous NDI value. Alternatively, if NDI-based transmission is not performed for a corresponding HARQ process ID, the previous NDI value may not be inherited. As a result, the NDI value of the corresponding HARQ process may not be determined. In addition, it is also difficult to determine, based on the NDI value, whether to transmit a new TB or retransmit a previously transmitted TB for the HARQ process.

For example, when the UE transmits a PUSCH on a resource allocated by an RAR grant in the random access procedure and then receives DCI that schedules PUSCH transmission, if an NDI value to be compared with an NDI in the DCI is missing from a scheduling message including the RAR grant, it is difficult for the UE to determine, based on the DCI, whether to transmit a new PUSCH or retransmit the previously transmitted PUSCH. In addition, regarding the previous scheduling that contains no DCI, there may be also a problem that the UE needs to always assume the new PUSCH transmission even if the retransmission is required.

To solve these problems, the following methods may be considered.

<Method 1>

The BS may configure a timer related to NDI missing scheduling for the UE. In particular, when the UE receives an RAR grant in a CF-RACH process or when the UE performs a RACH process in the RRC-CONNECTED state due to the absence of a valid SR resource, this method may be considered. For example, the UE may start the configured timer upon receipt of NDI missing scheduling and assume that if another scheduling message is received before the timer expires, the other scheduling message schedules retransmission of previous transmission. The other scheduling message transmitted after the timer starts may be a UL grant indicating the same HARQ process ID in DCI or different NDI missing scheduling. In other words, the UE may operate under the assumption that a scheduling message received before the timer expires is a scheduling message for retransmission and a scheduling message received after the timer expires is a scheduling message for new transmission.

For example, the BS may configure for the UE a timer that the UE is capable of using to determine whether to perform PUSCH transmission or retransmission when an NDI is missing. When the UE receives scheduling information with no NDI (e.g., RRC reconfiguration, DCI grant, etc.) from the BS, the UE may start the timer. If the UE receives a scheduling message before the timer expires, the UE may recognize the scheduling message as resource allocation information for retransmission of a previously transmitted PUSCH. If the UE receives a scheduling message after the timer expires, the UE may recognize the scheduling message as resource allocation information for transmission of a new PUSCH. In other words, the BS may configure the timer for the UE based on the determination that the BS does not request retransmission of a PUSCH transmitted by the UE if a predetermined time elapses after the PUSCH is transmitted. Thus, even if the UE receives an NDI in another scheduling message after transmitting the PUSCH based on scheduling information including no NDI, the UE may be allowed to determine whether or not to retransmit the PUSCH.

In this case, the length of the timer may be determined by other related configurations. For example, when a timer for determining whether to retransmit a PUSCH based on a configuration grant or a PUSCH transmitted in the RACH process is configured by the BS for the UE and then used, the length of the timer may be determined by the configuration grant or the period of a RACH resource, P or P*K. In this case, K may be determined through L1 signaling (e.g., DCI) and/or higher layer signaling (e.g., RRC signaling) or preconfigured.

<Method 2>

When the BS transmits to the UE a scheduling message with no NDI, the UE may always assume a specific NDI value. The specific NDI value may be predetermined or provided by the BS to the UE through higher layer signaling. That is, by assuming a fixed NDI for NDI missing scheduling, the UE may determine whether a scheduling message transmitted over a PDCCH indicates retransmission or new transmission.

For example, when the UE receives scheduling where an NDI is missing or omitted, the UE may recognize an NDI value as a specific fixed value. For example, when the UE receives scheduling information where an NDI value is not included or is missing, the UE may retransmit a PUSCH or transmit a new PUSCH based on a fixed or configured NDI value.

In some implementations of the present disclosure, when the UE receives a scheduling message through NDI missing scheduling or higher layer signaling (e.g., RAR MAC CE), the UE may always assume new transmission. For example, when the UE receives a scheduling message through NDI missing scheduling or higher layer signaling, the UE may terminate or flush previous transmission for the same HARQ process and create a new TB, regardless of the value of an NDI received before the NDI is missing or omitted. At the same time, the UE may store a predetermined NDI value as the NDI value of a corresponding HARQ process.

In some implementations of the present disclosure, the specific value may be defined as a previously received NDI value for the same HARQ process.

Compared to Method 1 of determining whether DCI is for retransmission or new transmission based on a timer, no timer may be configured in some implementations according to Method 2, and thus signaling overhead required to configure the timer may be reduced.

<Method 3>

When the UE transmits a PUSCH based on NDI missing scheduling, the UE may use an NDI value used for previous transmission or an NDI value received in previous scheduling information. Alternatively, if no NDI value is included in the previous scheduling information, the UE may configure the NDI value to a specific value and perform PUSCH transmission or retransmission, similarly to Method 2.

Method 3-1

For example, the UE may always assume that the PUSCH based on NDI missing scheduling is new transmission and store a value toggled from the previous NDI value of the same HARQ process, which the UE is saving, as the NDI value of the corresponding scheduling.

Method 3-2

When no NDI value exist in the previous transmission, the UE may perform PUSCH transmission or retransmission by assuming or recognizing the NDI value as a specific value (e.g., 0) or an arbitrary value.

Method 3-3

When the UE arbitrarily determines the NDI value, the UE may piggyback and transmit the determined NDI value on the PUSCH. In this case, the piggyback method may be the same as that used for the HARQ-ACK or SR, or a method of indicating the NDI by adding one bit to the HARQ-ACK codebook may be considered. For a case in which it is ambiguous whether the corresponding NDI determination method is used or not, both rate-matching and puncturing may be considered when the NDI is piggybacked on the PUSCH. When the UE piggybacks or does not piggyback the NDI on the PUSCH arbitrarily, the above operation may prevent the BS from having a problem in decoding the PUSCH even if the BS may not know whether the NDI is piggybacked on the PUSCH. For example, by considering an RE on which the NDI is piggybacked, the UE and BS may perform PUSCH RE mapping except for the RE. Alternatively, the UE and BS may perform the same PUSCH RE mapping as that when the NDI is not piggybacked, without considering the RE on which the NDI is piggybacked.

<Method 4>

When the UE performs PUSCH transmission based on NDI missing scheduling, the UE may not consider retransmission for the corresponding PUSCH transmission. In other words, after transmitting the PUSCH based on the NDI missing scheduling, the UE may assume that other scheduling messages with the same HARQ process are always related to new transmission, regardless of NDI values included in the messages. Method 4 may be considered as a fallback operation for other implementations. For example, if the BS does not configure any timers for a UE using Method 1 through higher layer signaling, the UE may assume that there is no retransmission for NDI missing scheduling.

<Method 5>

If there is no NDI value for a HARQ process related to a scheduling message or if there is no NDI value in a previously transmitted scheduling message, the UE may always assume that an NDI is toggled, regardless of NDI values indicated by the corresponding scheduling message. Method 5 may be useful when NDI missing scheduling is indicated as the first transmission of the corresponding HARQ process ID. For example, when no NDI value is included in a scheduling message previously received from the BS or when no NDI value is stored for a HARQ process related thereto, if an NDI value is transmitted in DCI on a PDCCH, the UE may always recognize that the NDI value in the DCI is a toggled value and perform PDSCH reception or PUSCH transmission.

<Method 6>

If NDI missing scheduling indicates a HARQ process ID or if the UE assumes a specific HARQ process ID (e.g., 0) for the NDI missing scheduling, the UE may assume that retransmission scheduling will be transmitted for the same HARQ process. If scheduling without the corresponding HARQ process ID (or with another HARQ process ID) is indicated after the NDI missing scheduling, the UE may flush the corresponding HARQ process or assume that scheduling after the corresponding HARQ process ID is scheduling for new transmission.

Figure 11:
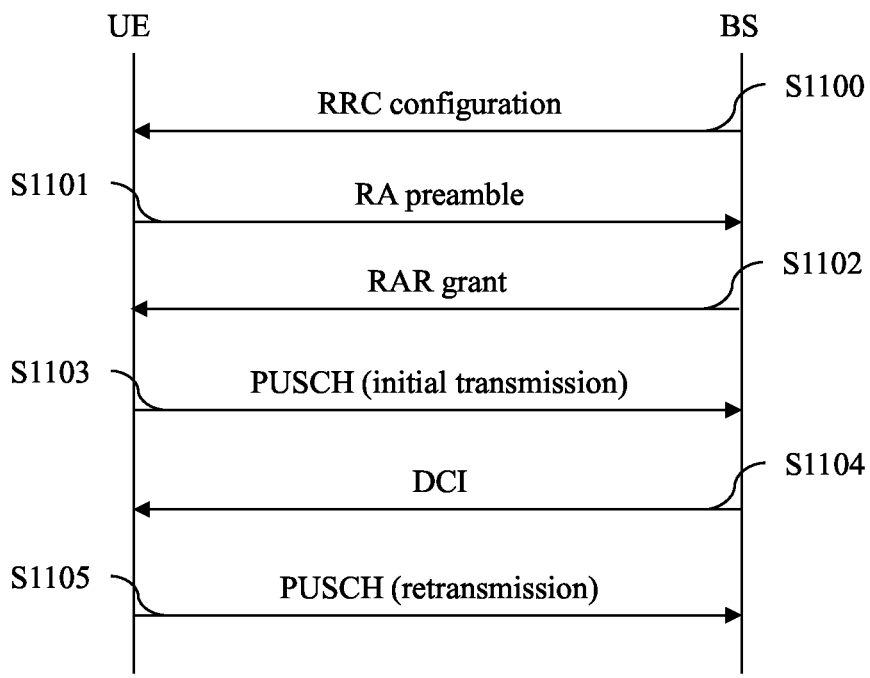
FIG. 11 illustrates signaling between a base station (BS) and a user equipment (UE) according to some implementations of the present disclosure.

FIG. 11 illustrates signaling between a BS and a UE according to some implementations of the present disclosure. For example, NDI missing/included scheduling may be interpreted according to implementations 1 to 6. Here, the UE and BS are merely examples, and FIG. 11 may be applied to various devices mentioned above in FIG. 1.

Referring to FIG. 11, the UE may support new transmission or retransmission based on the interpretation of an NDI. Some step(s) of the steps shown in FIG. 11 may be omitted depending on situations and/or configurations.

The UE (e.g., 100/200 in FIG. 2) may be allocated a UL resource by the BS (e.g., 200/100 in FIG. 2) in a higher layer message in procedures such as random access, etc. (S1102) and transmit a PUSCH on the UL resource (S1103).

In some implementations of the present disclosure, the UE may receive RRC configuration information from the BS (S1100) and transmit an RA preamble to the BS in response to the RRC configuration information or based on the RRC configuration information (S1101). In some implementations, the RRC configuration information may include scheduling information related to the PUSCH transmission. In addition, the RRC configuration information may consist of one or more configurations and be delivered to the UE through UE-specific RRC signaling. In some implementations (e.g., Method 1), the RRC configuration information may include parameters related to configurations such as a timer. In some implementations (e.g., Method 2 and Method 3), the RRC configuration information may include parameters necessary for setting the value of an NDI to a specific value.

In some implementations, the operation in which the UE receives the RRC configuration information related to the PUSCH from the BS and transmits the PUSCH based on the RRC configuration information may be implemented by the device described in FIG. 2. For example, referring to FIG. 2, the one or more processors 102 may control the one or more transceivers 106 and/or one or more memories 104 to receive the RRC configuration information related to the PUSCH transmission and transmit the PUSCH based on the RRC configuration information, and the one or more transceivers 106 may receive the RRC configuration information from the BS and transmit the PUSCH based on the RRC configuration information.

The UE may receive DCI scheduling a PUSCH from the BS (S1104). For example, the UE may receive DCI on resource allocation for PUSCH transmission/retransmission from the BS. In some implementations of the present disclosure, the DCI may include resource allocation information on the PUSCH transmission/retransmission and an NDI indicating the PUSCH transmission/retransmission.

In some implementations, the operation in which the UE receives the DCI from the BS (e.g., S1104) may be implemented by the wireless device of FIG. 2. For example, referring to FIG. 2, the one or more processors 102 may control the one or more transceivers 106 and/or the one or more memories 104 to receive the DCI, and the one or more transceivers 106 may receive the DCI from the BS.

Thereafter, the UE may determine a resource allocated for the PUSCH transmission/retransmission based on the received RRC configuration information and/or a UL grant in the DCI. In some implementations, the allocated resource may be determined based on the resource allocation information in the DCI received in S1104.

The UE may determine whether to perform the PUSCH transmission or retransmission based on the NDI included in the DCI received in S1104. For example, as described in Methods 1 to 5, the UE may determine whether the NDI is included in the DCI and/or whether the resource allocated based on the NDI value is a resource for transmission of a PUSCH or a resource allocated for retransmission of the previously transmitted PUSCH.

In some implementations of the present disclosure, the UE may determine whether the NDI is included in the DCI and whether to perform the PUSCH transmission or retransmission based on the NDI value. For example, as described above in one or more of Methods 1 to 6, the UE may retransmit the PUSCH or transmit a new PUSCH depending on the timing at which the NDI is received and whether the NDI is included.

In some implementations of the present disclosure, receiving, by the UE, the DCI from the BS and determining, by the UE, the PUSCH transmission or retransmission may be implemented by, for example, the wireless device of FIG. 2. For example, referring to FIG. 2, the one or more processors 102 may control the one or more transceivers 106 and/or one or more memories 104 to receive DCI scheduling UL transmission (hereinafter, UL grant DCI), and the one or more transceivers 106 may receive the UL grant DCI from the BS.

The UE may transmit the PUSCH on a UL resource determined based on the RRC configurations or UL grant DCI. For example, as described in one or more of Methods 1 to 6, the UE may perform the PUSCH transmission or retransmission based on the resource allocation information and/or NDI included in the DCI.

The transmission of the PUSCH by the UE to the BS in S1105 may be implemented by the wireless device of FIG. 2. For example, referring to FIG. 2, the one or more processors 102 may control the one or more transceivers 106 and/or one or more memories 104 to transmit the PUSCH, and the one or more transceivers 106 may transmit the PUSCH to the BS.

Figure 12:
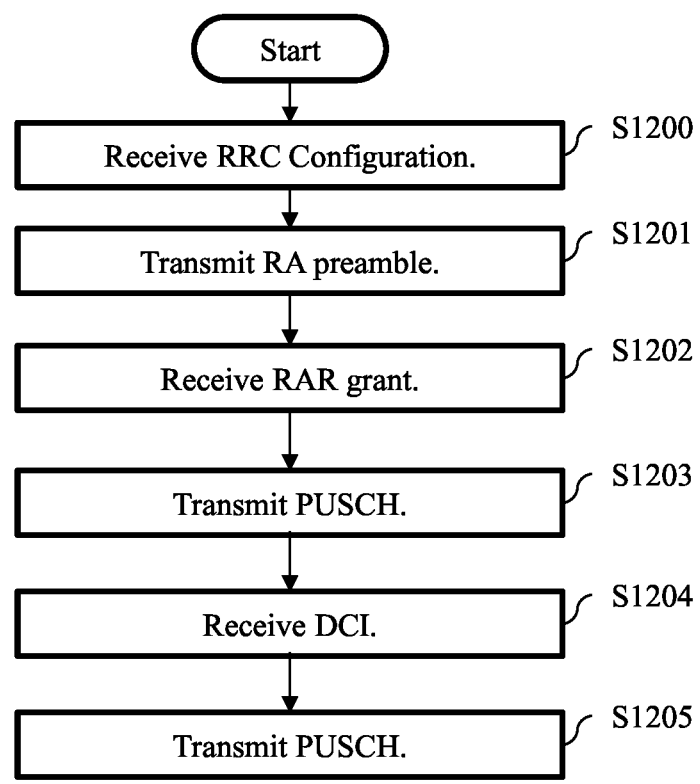
FIG. 12 illustrates PUSCH transmission by a UE according to some implementations of the present disclosure.

FIG. 12 illustrates PUSCH transmission by a UE according to some implementations of the present disclosure. For example, FIG. 12 is a flowchart in which the UE transmits and/or retransmits UL data based on the setting or interpretation of an NDI to which Methods 1 to 6 are applicable. Here, the UE is merely an example, and FIG. 12 may be applied to various devices mentioned above in FIG. 1. Some step(s) of the steps shown in FIG. 12 may be omitted depending on situations and/or configurations.

The UE may receive RRC configuration information from a BS (S1200) and transmit an RA preamble to the BS in response to the RRC configuration information or based on the RRC configuration information (S1201). In some implementations, the RRC configuration information may include scheduling information related to the PUSCH transmission. In addition, the RRC configuration information may consist of one or more configurations and be delivered to the UE through UE-specific RRC signaling. In some implementations (e.g., Method 1), the RRC configuration information may include parameters related to configurations such as a timer. In some implementations (e.g., Method 2 and Method 3), the RRC configuration information may include parameters necessary for setting the value of an NDI to a specific value.

The UE may be allocated a UL resource by the BS in a higher layer message (e.g., RAR MAC CE) in procedures such as random access, etc. (S1202) and transmit a PUSCH on the UL resource (S1203).

In some implementations, the operation in which the UE receives the RRC configuration information related to the PUSCH from the BS and transmits the PUSCH based on the RRC configuration information may be implemented by the device described in FIG. 2. For example, referring to FIG. 2, the one or more processors 102 may control the one or more transceivers 106 and/or one or more memories 104 to receive the RRC configuration information related to the PUSCH transmission and transmit the PUSCH based on the RRC configuration information, and the one or more transceivers 106 may receive the RRC configuration information from the BS and transmit the PUSCH based on the RRC configuration information.

The UE may receive DCI scheduling a PUSCH from the BS (S1204). In some implementations of the present disclosure, the DCI may include resource allocation information on PUSCH transmission/retransmission and an NDI indicating the PUSCH transmission/retransmission.

In some implementations, the operation in which the UE receives the DCI from the BS (e.g., S1204) may be implemented by the wireless device of FIG. 2. For example, referring to FIG. 2, the one or more processors 102 may control the one or more transceivers 106 and/or the one or more memories 104 to receive the DCI, and the one or more transceivers 106 may receive the DCI from the BS.

Thereafter, the UE may determine a resource allocated for the PUSCH transmission/retransmission based on the received RRC configuration information and/or a UL grant in the DCI. In some implementations, the allocated resource may be determined based on the resource allocation information in the DCI received in S1204.

The UE may determine whether to perform the PUSCH transmission or retransmission based on the NDI included in the DCI received in S1104. For example, as described in Methods 1 to 5, the UE may determine whether the NDI is included in the DCI and/or whether the resource allocated based on the NDI value is a resource for transmission of a new PUSCH or a resource allocated for retransmission of the previously transmitted PUSCH.

In some implementations of the present disclosure, the UE may determine whether the NDI is included in the DCI and whether to perform the PUSCH transmission or retransmission based on the NDI value. For example, as described above in one or more of Methods 1 to 6, the UE may retransmit the PUSCH or transmit the new PUSCH depending on the timing at which the NDI is received and whether the NDI is included.

In some implementations of the present disclosure, receiving, by the UE, the DCI from the BS and determining, by the UE, the PUSCH transmission or retransmission may be implemented by, for example, the wireless device of FIG. 2. For example, referring to FIG. 2, the one or more processors 102 may control the one or more transceivers 106 and/or one or more memories 104 to receive UL grant DCI, and the one or more transceivers 106 may receive the UL grant DCI from the BS.

The UE may transmit the PUSCH on a UL resource determined based on the RRC configurations or UL grant DCI. For example, as described in one or more of Methods 1 to 6, the UE may perform the PUSCH transmission or retransmission based on the resource allocation information and/or NDI included in the DCI.

The transmission of the PUSCH by the UE to the BS in S1205 may be implemented by the wireless device of FIG. 2. For example, referring to FIG. 2, the one or more processors 102 may control the one or more transceivers 106 and/or one or more memories 104 to transmit the PUSCH, and the one or more transceivers 106 may transmit new UL data or retransmit the previously transmitted UL data on the PUSCH to the BS.

FIG. 13 illustrates PUSCH reception by a BS according to some implementations of the present disclosure. For example, FIG. 13 is a flowchart in which the BS receives and/or re-receives UL data based on the setting or interpretation of an NDI to which Methods 1 to 6 are applicable. Here, the BS is merely an example, and FIG. 13 may be applied to various devices mentioned above in FIG. 1. Some step(s) of the steps shown in FIG. 13 may be omitted depending on situations and/or configurations.

The BS may receive RRC configuration information to the UE (S1300) and receive an RA preamble from the UE in response to the RRC configuration information or based on the RRC configuration information (S1301). In some implementations, the RRC configuration information may include scheduling information related to PUSCH transmission. In addition, the RRC configuration information may consist of one or more configurations and be delivered to the UE through UE-specific RRC signaling. In some implementations (e.g., Method 1), the RRC configuration information may include parameters related to configurations such as a timer. In some implementations (e.g., Method 2 and Method 3), the RRC configuration information may include parameters necessary for setting the value of an NDI to a specific value.

The BS may allocate a UL resource to the UE in a higher layer message (e.g., RAR MAC CE) in procedures such as random access (S1302) and receive a PUSCH on the UL resource (S1303).

In some implementations, the operation in which the BS transmits the RRC configuration information related to the PUSCH to the UE and transmits the PUSCH based on the RRC configuration information may be implemented by the device described in FIG. 2. For example, referring to FIG. 2, the one or more processors 202 may control the one or more transceivers 206 and/or one or more memories 204 to transmit the RRC configuration information related to the PUSCH transmission and receive the PUSCH based on the RRC configuration information.

The BS may transmit DCI scheduling a PUSCH to the UE (S1304). For example, the BS may transmit DCI on resource allocation for PUSCH transmission/retransmission to the UE. In some implementations of the present disclosure, the DCI may include resource allocation information on the PUSCH transmission/retransmission and an NDI indicating the PUSCH transmission/retransmission.

In some implementations, the operations in which the BS transmits the DCI to the UE (e.g., S1304) may be implemented by the wireless device of FIG. 2. For example, referring to FIG. 2, the one or more processors 202 may control the one or more transceivers 106 and/or one or more memories 204 to transmit the DCI, and the one or more transceivers 206 may transmit the DCI to the UE.

The UE and BS may determine a resource allocated for the PUSCH transmission/retransmission based on the RRC configuration information and/or a UL grant in the DCI transmitted by the BS to the UE. In some implementations, the allocated resource may be determined based on the resource allocation information in the DCI transmitted in S1304.

The BS may include the NDI in the DCI, which is transmitted in S1204, to inform the UE whether the PUSCH transmission or retransmission is required. For example, as described in one or more of Methods 1 to 5, the BS may set the NDI value in the DCI depending on whether the NDI is to be included in the DCI and/or whether the resource to be allocated to the UE is a resource for transmission of a new PUSCH or a resource for retransmission of the previously transmitted PUSCH.

In some implementations of the present disclosure, the BS may determine the NDI value to be included in the DCI depending on whether the scheduled PUSCH is for new transmission or retransmission. For example, as described in one or more of Methods 1 to 6, the BS may receive UL retransmission or new UL transmission from the UE depending on the timing at which the NDI is transmitted and whether the NDI is included.

The BS may receive the PUSCH from the UE on the determined resource. For example, as described in one or more of Methods 1 to 6, the BS may receive the PUSCH transmission or retransmission based on the resource allocation information and/or NDI included in the DCI.

The reception of the PUSCH by the BS from the UE in S1305 may be implemented by the wireless device of FIG. 2. For example, referring to FIG. 2, the one or more processors 202 may control the one or more transceivers 206 and/or one or more memories 204 to receive the PUSCH, and the one or more transceivers 206 may receive new UL transmission or retransmission of previously received UL transmission on the PUSCH from the UE.

For performing a UL transmission, a UE may perform operations according to some implementations of the present disclosure. The UE may include: at least one transceiver; at least one processor; and at least one computer memory operably connected to the at least one processor and configured to store instructions that, when executed, cause the at least one processor to perform the operations according to some implementations of the present disclosure. A processing device for a UE may include: at least one processor; and at least one computer memory operably connected to the at least one processor and configured to store instructions that, when executed, cause the at least one processor to perform the operations according to some implementations of the present disclosure. A computer-readable storage medium may store at least one computer program including instructions that, when executed by at least one processor, cause the at least one processor to perform the operations according to some implementations of the present disclosure. The operations may include: receiving a first scheduling message with no NDI; performing first UL transmission based on the reception of the first scheduling message; receiving a second scheduling message including an NDI field; and performing i) retransmission of the first UL transmission or ii) new UL transmission based on the NDI field in the second scheduling message. Performing the retransmission of the first UL transmission or the new UL transmission may include: determining whether a value of the NDI field is toggled compared to a specific value while considering an NDI value for the first scheduling message as the specific value; performing the retransmission of the first UL transmission based on the value of the NDI field being not toggled compared to the specific value; and performing the new UL transmission based on the value of the NDI field being toggled compared to the specific value.

The first scheduling message may be related to a same HARQ process as a HARQ process related to the second scheduling message. The second scheduling message may include a HARQ process ID of the HARQ process. The first scheduling message may include no HARQ process ID.

The operations may include: transmitting a random access preamble. The first scheduling message may include an RAR to the random access preamble.

Transmitting the random access preamble may include transmitting the random access preamble for an SR.

The operations may further include: receiving a PDCCH order. Transmitting the random access preamble may include transmitting the random access preamble based on the PDCCH order.

Receiving the second scheduling message may include receiving the second scheduling message on a PDCCH.

For receiving a UL transmission from a UE, a BS may perform operations according to some implementations of the present disclosure. The BS may include: at least one transceiver; at least one processor; and at least one computer memory operably connected to the at least one processor and configured to store instructions that, when executed, cause the at least one processor to perform the operations according to some implementations of the present disclosure. A processing device for a BS may include: at least one processor; and at least one computer memory operably connected to the at least one processor and configured to store instructions that, when executed, cause the at least one processor to perform the operations according to some implementations of the present disclosure. A computer-readable storage medium may store at least one computer program including instructions that, when executed by at least one processor, cause the at least one processor to perform the operations according to some implementations of the present disclosure. The operations may include: transmitting a first scheduling message with no NDI to the UE; receiving first UL transmission based on the transmission of the first scheduling message; transmitting a second scheduling message including an NDI field to the UE; and receiving i) retransmission of the first UL transmission or ii) new transmission from the UE based on the NDI field in the second scheduling message. Receiving the retransmission of the first UL transmission or the new UL transmission may include: determining whether a value of the NDI field is toggled compared to a specific value while considering an NDI value for the first scheduling message as the specific value; receiving the retransmission of the first UL transmission based on the value of the NDI field being not toggled compared to the specific value; and receiving the new UL transmission based on the value of the NDI field being toggled compared to the specific value.

The first scheduling message may be related to a same HARQ process as a HARQ process related to the second scheduling message. The second scheduling message may include a HARQ process ID of the HARQ process. The first scheduling message may include no HARQ process ID.

The operations may include: receiving a random access preamble. The first scheduling message may include an RAR to the random access preamble.

Receiving the random access preamble may include receiving the random access preamble for an SR.

The operations may further include transmitting a PDCCH order. Receiving the random access preamble may include receiving the random access preamble based on the PDCCH order.

Transmitting the second scheduling message may include transmitting the second scheduling message on a PDCCH.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

The invention claimed is:

1. A method of performing uplink transmission in a user equipment (UE) in a wireless communication system, the method comprising:
receiving a first scheduling message with no new data indicator (NDI);
performing first uplink transmission based on receiving the first scheduling message;
receiving a second scheduling message including an NDI field; and
performing i) retransmission of the first uplink transmission or ii) new uplink transmission based on the NDI field in the second scheduling message,
wherein performing the retransmission of the first uplink transmission or the new uplink transmission comprises:
determining whether a value of the NDI field is toggled compared to a specific value while considering an NDI value for the first scheduling message as the specific value;
performing the retransmission of the first uplink transmission based on the value of the NDI field being not toggled compared to the specific value; and
performing the new uplink transmission based on the value of the NDI field being toggled compared to the specific value.

2. The method of claim 1, wherein the first scheduling message is related to a same hybrid automatic repeat and request (HARQ) process as a HARQ process related to the second scheduling message.

3. The method of claim 2, wherein the second scheduling message includes a HARQ process identifier of the HARQ process.

4. The method of claim 1, comprising:
transmitting a random access preamble,
wherein the first scheduling message includes a random access response to the random access preamble.

5. The method of claim 4, wherein the random access preamble is transmitted for a scheduling request.

6. The method of claim 4, further comprising:
receiving a physical downlink control channel (PDCCH) order,
wherein the random access preamble is transmitted based on the PDCCH order.

7. The method of claim 1, wherein the second scheduling message is received on a physical downlink control channel (PDCCH).

8. A method of receiving uplink transmission from a user equipment (UE) by a base station (BS) in a wireless communication system, the method comprising:
transmitting a first scheduling message with no new data indicator (NDI) to the UE;
receiving first uplink transmission based on transmitting the first scheduling message;
transmitting a second scheduling message including an NDI field to the UE; and
receiving i) retransmission of the first uplink transmission or ii) new transmission from the UE based on the NDI field in the second scheduling message,
wherein receiving the retransmission of the first uplink transmission or the new uplink transmission comprises:
determining whether a value of the NDI field is toggled compared to a specific value while considering an NDI value for the first scheduling message as the specific value;
receiving the retransmission of the first uplink transmission based on the value of the NDI field being not toggled compared to the specific value; and
receiving the new uplink transmission based on the value of the NDI field being toggled compared to the specific value.

9. The method of claim 8, wherein the first scheduling message is related to a same hybrid automatic repeat and request (HARQ) process as a HARQ process related to the second scheduling message.

10. The method of claim 9, wherein the second scheduling message includes a HARQ process identifier of the HARQ process.

11. The method of claim 8, comprising:
receiving a random access preamble from the UE,
wherein the first scheduling message includes a random access response to the random access preamble.

12. The method of claim 11, further comprising:
transmitting a physical downlink control channel (PDCCH) order to the UE,
wherein the random access preamble is received based on the PDCCH order.

13. The method of claim 8, wherein the second scheduling message is transmitted on a physical downlink control channel (PDCCH).

14. A user equipment (UE) configured to perform uplink transmission in a wireless communication system, the UE comprising:
at least one transceiver;
at least one processor; and
at least one computer memory operably connected to the at least one processor and configured to store instructions that, when executed, cause the at least one processor to perform operations comprising:
receiving a first scheduling message with no new data indicator (NDI);
performing first uplink transmission based on receiving the first scheduling message;
receiving a second scheduling message including an NDI field; and
performing i) retransmission of the first uplink transmission or ii) new uplink transmission based on the NDI field in the second scheduling message,
wherein performing the retransmission of the first uplink transmission or the new uplink transmission comprises:
determining whether a value of the NDI field is toggled compared to a specific value while considering an NDI value for the first scheduling message as the specific value;
performing the retransmission of the first uplink transmission based on the value of the NDI field being not toggled compared to the specific value; and
performing the new uplink transmission based on the value of the NDI field being toggled compared to the specific value.

* * * * *